United States Patent
Taherzadeh Boroujeni et al.

(10) Patent No.: US 11,683,825 B1
(45) Date of Patent: Jun. 20, 2023

(54) TECHNIQUES FOR MULTI-HYPOTHESIS RECEPTION FOR SCHEDULED COMMUNICATIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Iyab Issam Sakhnini, San Diego, CA (US); Jelena Damnjanovic, Del Mar, CA (US); Juan Montojo, San Diego, CA (US); Peter Gaal, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/536,842

(22) Filed: Nov. 29, 2021

(51) Int. Cl.
  *H04W 72/12* (2023.01)
  *H04W 72/04* (2023.01)
  *H04L 27/26* (2006.01)

(52) U.S. Cl.
  CPC ..... *H04W 72/1231* (2013.01); *H04L 27/2676* (2013.01); *H04W 72/042* (2013.01)

(58) Field of Classification Search
  CPC ............ H04W 72/1231; H04W 72/042; H04L 27/2676
  See application file for complete search history.

(56) References Cited

U.S. PATENT DOCUMENTS

2022/0030559 A1\* 1/2022 Boroujeni ........... H04W 72/048

\* cited by examiner

*Primary Examiner* — Ronald B Abelson
(74) *Attorney, Agent, or Firm* — Dalei Dong; Holland & Hart LLP

(57) ABSTRACT

Methods, systems, and devices for wireless communications are described for scheduled communications in which multiple different communication instances are scheduled between a user equipment (UE) and a base station. Different communication parameters for different communication instances may be selected based on reported channel conditions between the UE and the base station. Subsequent to a report of channel conditions results in chanced communication parameters, the UE may blind decode a one or more scheduled communications using multiple candidate sets of decoding hypotheses to identify a first candidate set of decoding parameters that is used for the first scheduled communication. Such techniques provide that communication parameters may be adjusted based on channel conditions, and a UE may decode a communication in the event that the base station does not successfully receive a measurement report and continues transmissions using a prior set of parameters.

30 Claims, 16 Drawing Sheets

■ First Measurement Report 215

▨ First UL Communications 220

▢ First DL Communications 225

■ Second Measurement Report 230

▨ Second UL Communications 235

▨ Second DL Communications 240

TECHNIQUES FOR MULTI-HYPOTHESIS RECEPTION FOR SCHEDULED COMMUNICATIONS

FIELD OF TECHNOLOGY

The following relates to wireless communications, including techniques for multi-hypothesis reception for scheduled communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, base stations may provide UEs with various parameters for wireless communications, such as, for example, wireless resources, modulation orders, coding schemes, repetition schemes, acknowledgment procedures, multiple-input multiple-output (MIMO) schemes, or combinations thereof. Such communications parameters may be adjusted based on various factors, such as conditions of a channel between the UE and base station (e.g., based on a measured amount of interference or received powers of signals), load factors (e.g., an amount of traffic being served by a base station), priorities of different communications (e.g., higher priority communications versus best efforts data transmissions), among others. Efficient adjustment of such communications parameters may help to enhance network efficiency and reliability.

SUMMARY

The described techniques relate to improved methods, systems, devices, and apparatuses that support techniques for multi-hypothesis reception for scheduled communications. In accordance with various aspects, the described techniques provide for scheduled communications in which multiple different communication instances are scheduled between a user equipment (UE) and a base station, and different communication parameters for different communication instances may be selected based on one or more factors. In some cases, the base station may provide a UE with two or more sets of decoding parameters for scheduled communications, and a first set of communication parameters may be selected at both the base station and the UE based at least in part on channel conditions between the UE and the base station. In some cases the UE may blind decode a first scheduled communication using multiple candidate sets of decoding hypotheses to identify a first candidate set of decoding parameters of the candidate sets of decoding parameters that is used for the first scheduled communication. Such techniques provide that communication parameters may be adjusted based on channel conditions, and a UE may decode a communication in the event that the base station did not successfully receive a measurement report and continued transmissions using a prior set of parameters.

A method for wireless communication at a UE is described. The method may include receiving, from a base station, an indication of a set of multiple sets of decoding parameters for a set of multiple scheduled communications between the UE and the base station, identifying a set of multiple candidate sets of decoding parameters from the set of multiple sets of decoding parameters based on a first set of channel conditions between the UE and the base station, identifying, based on blind decoding at least a first scheduled communication using each of the set of multiple candidate sets of decoding parameters, a first candidate set of decoding parameters of the set of multiple candidate sets of decoding parameters is used for at least the first scheduled communication, and communicating with the base station according to the first candidate set of decoding parameters for one or more of the set of multiple scheduled communications.

An apparatus for wireless communication at a UE is described. The apparatus may include a processor, memory coupled with the processor, and instructions stored in the memory. The instructions may be executable by the processor to cause the apparatus to receive, from a base station, an indication of a set of multiple sets of decoding parameters for a set of multiple scheduled communications between the UE and the base station, identify a set of multiple candidate sets of decoding parameters from the set of multiple sets of decoding parameters based on a first set of channel conditions between the UE and the base station, identify, based on blind decoding at least a first scheduled communication using each of the set of multiple candidate sets of decoding parameters, a first candidate set of decoding parameters of the set of multiple candidate sets of decoding parameters is used for at least the first scheduled communication, and communicate with the base station according to the first candidate set of decoding parameters for one or more of the set of multiple scheduled communications.

Another apparatus for wireless communication at a UE is described. The apparatus may include means for receiving, from a base station, an indication of a set of multiple sets of decoding parameters for a set of multiple scheduled communications between the UE and the base station, means for identifying a set of multiple candidate sets of decoding parameters from the set of multiple sets of decoding parameters based on a first set of channel conditions between the UE and the base station, means for identifying, based on blind decoding at least a first scheduled communication using each of the set of multiple candidate sets of decoding parameters, a first candidate set of decoding parameters of the set of multiple candidate sets of decoding parameters is used for at least the first scheduled communication, and means for communicating with the base station according to the first candidate set of decoding parameters for one or more of the set of multiple scheduled communications.

A non-transitory computer-readable medium storing code for wireless communication at a UE is described. The code may include instructions executable by a processor to receive, from a base station, an indication of a set of multiple sets of decoding parameters for a set of multiple scheduled communications between the UE and the base station, identify a set of multiple candidate sets of decoding parameters from the set of multiple sets of decoding parameters based on a first set of channel conditions between the UE and the base station, identify, based on blind decoding at least a first scheduled communication using each of the set of multiple candidate sets of decoding parameters, a first candidate set of decoding parameters of the set of multiple candidate sets of decoding parameters is used for at least the first scheduled communication, and communicate with the base station according to the first candidate set of decoding parameters for one or more of the set of multiple scheduled communications.

Some examples of the method, apparatuses, and non-transitory computer-readable medium described herein may further include operations, features, means, or instructions for determining a transient window during which blind decoding using each of the set of multiple candidate sets of decoding parameters is to be performed, where the blind decoding is performed for one or more scheduled communications occasions within the transient window. Some examples of the method, apparatuses, and non-transitory computer-readable medium described herein may further include operations, features, means, or instructions for transmitting a measurement report to the base station that indicates the first set of channel conditions, and where the transient window is started responsive to transmission of the measurement report. In some examples of the method, apparatuses, and non-transitory computer-readable medium described herein, a length of the transient window may be predetermined or indicated by the base station in configuration signaling. In some examples of the method, apparatuses, and non-transitory computer-readable medium described herein, the length of the transient window corresponds to a number of slots, an absolute time period, a number of instances of the set of multiple scheduled communications, a frequency range used for the set of multiple scheduled communications, a subcarrier spacing of the set of multiple scheduled communications, or any combinations thereof. In some examples of the method, apparatuses, and non-transitory computer-readable medium described herein, the length of the transient window corresponds to a time period until the UE receives a confirmation of a change in decoding parameters from the base station.

Some examples of the method, apparatuses, and non-transitory computer-readable medium described herein may further include operations, features, means, or instructions for receiving, from the base station, a confirmation that the first candidate set of decoding parameters is to be used for the set of multiple scheduled communications, the confirmation provided in a medium access control (MAC) control element (CE), in downlink control information (DCI), in one of the set of multiple scheduled communications, or based on successful decoding of the first scheduled communication using the first candidate set of decoding parameters.

In some examples of the method, apparatuses, and non-transitory computer-readable medium described herein, the receiving may include operations, features, means, or instructions for receiving multiple different sets of resources, transmission parameters, or any combinations thereof, that are mapped to different sets of channel conditions, and where the set of multiple candidate sets of decoding parameters include the first candidate set of decoding parameters that is mapped to the first set of channel conditions, and a second candidate set of decoding parameters used for one or more scheduled communications prior to the first scheduled communication. In some examples of the method, apparatuses, and non-transitory computer-readable medium described herein, the multiple sets of decoding parameters provide different time resources, different frequency resources, different modulation and coding schemes, different multiple-input multiple-output (MIMO) ranks, different numbers of repetitions, different frequency hopping among multiple repetitions, or any combinations thereof, and where each of the set of multiple sets of decoding parameters have an associated range of measured channel conditions. In some examples of the method, apparatuses, and non-transitory computer-readable medium described herein, the measured channel conditions include one or more of a channel quality indicator, a reported layer-one (L1) reference signal received power (RSRP), a L1 signal to interference and noise ratio (SINR), or any combinations thereof. In some examples of the method, apparatuses, and non-transitory computer-readable medium described herein, the multiple sets of decoding parameters include two or more sets of semi-persistent scheduling (SPS) parameters for downlink SPS transmissions from the base station.

A method for wireless communication at a base station is described. The method may include transmitting, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications, receiving, from the UE, a measurement report that indicates the first set of channel conditions between the UE and the base station meeting a threshold value, selecting, based on the first set of channel conditions, a first set of decoding parameters from the set of multiple sets of decoding parameters, and transmitting one or more of the set of multiple scheduled communications to the UE based on the first set of decoding parameters.

An apparatus for wireless communication at a base station is described. The apparatus may include a processor, memory coupled with the processor, and instructions stored in the memory. The instructions may be executable by the processor to cause the apparatus to transmit, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications, receive, from the UE, a measurement report that indicates the first set of channel conditions between the UE and the base station meeting a threshold value, select, based on the first set of channel conditions, a first set of decoding parameters from the set of multiple sets of decoding parameters, and transmit one or more of the set of multiple scheduled communications to the UE based on the first set of decoding parameters.

Another apparatus for wireless communication at a base station is described. The apparatus may include means for transmitting, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications, means for receiving, from the UE, a measurement report that indicates the first set of channel conditions between the UE and the base station meeting a threshold value, means for selecting, based on the first set of channel conditions, a first set of decoding parameters from the set of multiple sets of decoding parameters, and means for transmitting one or more of the set of multiple scheduled communications to the UE based on the first set of decoding parameters.

A non-transitory computer-readable medium storing code for wireless communication at a base station is described. The code may include instructions executable by a processor to transmit, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications, receive, from the UE, a measurement report that indicates the first set of channel conditions between the UE and the base station meeting a threshold value, select, based on the first set of channel conditions, a first set of decoding parameters from the set of multiple sets of decoding parameters, and transmit one or more of the set of multiple scheduled communications to the UE based on the first set of decoding parameters.

Some examples of the method, apparatuses, and non-transitory computer-readable medium described herein may further include operations, features, means, or instructions for configuring the UE with a transient window during which the UE is to blind decode one or more of the set of multiple scheduled communications using each of the set of multiple candidate sets of decoding parameters. In some examples of the method, apparatuses, and non-transitory computer-readable medium described herein, the transient window may be started responsive to transmission of the measurement report. In some examples of the method, apparatuses, and non-transitory computer-readable medium described herein, a length of the transient window may be predetermined or indicated to the UE in configuration signaling.

In some examples of the method, apparatuses, and non-transitory computer-readable medium described herein, the length of the transient window corresponds to a number of slots, an absolute time period, a number of instances of the set of multiple scheduled communications, a frequency range used for the set of multiple scheduled communications, a subcarrier spacing of the set of multiple scheduled communications, or any combinations thereof. In some examples of the method, apparatuses, and non-transitory computer-readable medium described herein, the length of the transient window corresponds to a time period until the UE receives a confirmation of a change in decoding parameters from the base station.

Some examples of the method, apparatuses, and non-transitory computer-readable medium described herein may further include operations, features, means, or instructions for transmitting, to the UE, a confirmation that the first set of decoding parameters is to be used for the set of multiple scheduled communications, the confirmation provided in a MAC-CE, in DCI, in one of the set of multiple scheduled communications, or based on successful decoding of the one or more of the set of multiple scheduled communications using the first set of decoding parameters. In some examples of the method, apparatuses, and non-transitory computer-readable medium described herein, the configuration information includes a set of multiple different sets of resources, transmission parameters, or any combinations thereof, that are mapped to different sets of channel conditions, and where the set of multiple candidate sets of decoding parameters include the first set of decoding parameters that is mapped to the first set of channel conditions.

In some examples of the method, apparatuses, and non-transitory computer-readable medium described herein, the set of multiple sets of decoding parameters provide different time resources, different frequency resources, different modulation and coding schemes, different MIMO ranks, different numbers of repetitions, different frequency hopping among multiple repetitions, or any combinations thereof, and where each of the set of multiple sets of decoding parameters has an associated range of measured channel conditions. In some examples of the method, apparatuses, and non-transitory computer-readable medium described herein, the measured channel conditions include one or more of a channel quality indicator, a reported L1 RSRP, a L1 SINR, or any combinations thereof. In some examples of the method, apparatuses, and non-transitory computer-readable medium described herein, the set of multiple sets of decoding parameters include two or more sets of SPS parameters for downlink SPS transmissions from the base station.

DETAILED DESCRIPTION

Figure 1:
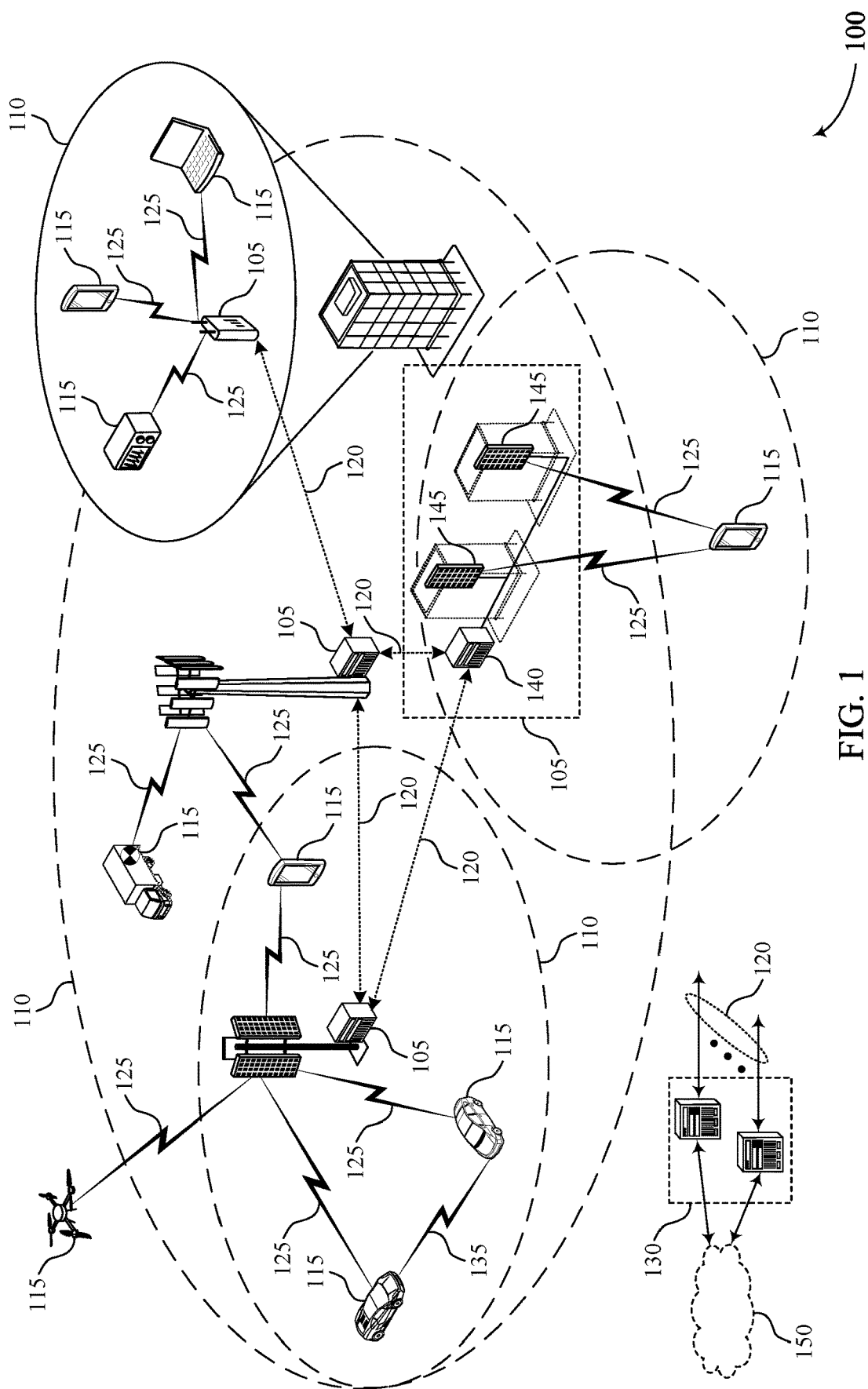
FIGS. 1 and 2 illustrate examples of wireless communications systems that supports techniques for multi-hypothesis reception for scheduled communications in accordance with aspects of the present disclosure.

Various wireless communications systems may employ link adaptation techniques to provide a data bandwidth that is tuned based on channel conditions between a transmitting device (e.g., a user equipment (UE) or a base station) and a receiving device (e.g., a UE or a base station). Link adaptation, for example, may include adjustments to an amount of resources for communications, a modulation and coding scheme (MCS) of communications, a multiple-input multiple-output (MIMO) rank for communications, activation or deactivation of coverage enhancement (CE) techniques, or combinations thereof. Link adaptation may be implemented by a base station through scheduling information (e.g., provided in a scheduling downlink control information (DCI) transmission) that indicates communications parameters for scheduled uplink or downlink transmissions (e.g., MCS, MIMO rank, CE). However, in some cases a base station and UE may be scheduled for a series of communications in which separate scheduling information is not provided for each particular communication instance. For example, a semi-persistent scheduling (SPS) configuration may be provided for a series of downlink communications, or a configured grant (CG) may be provided for a series of uplink communications, in which multiple instances of communications may be transmitted without a new resource grant.

In accordance with various aspects of the present disclosure, scheduled communications may be performed in which different communication parameters for different communication instances may be selected based on one or more factors, without additional control signaling associated with a particular communication instance. In some cases, a base station may provide a UE with multiple sets of decoding parameters for scheduled communications, with each set of decoding parameters associated with channel conditions between the UE and the base station. For example, the UE may measure one or more reference signals (e.g., a channel state information (CSI) reference signal (RS)) to obtain measured channel conditions, and transmit a measurement report that indicates the measured channel conditions. Based on the reported channel conditions, an associated set of decoding parameters may be selected at the UE and the base station for subsequent scheduled communications. However, in some cases, a measurement report may not be successfully received at the base station (e.g., due to interference between the UE and the base station). In such a case, the UE may switch from a first set of decoding parameters to a second set of decoding parameters for a scheduled communication, while the base station may continue using prior parameters corresponding to a prior measurement report.

As discussed in various examples, automatic link adaptation for scheduled communications (e.g., SPS or CG communications) while accounting for potential mismatches between sets of communications parameters (e.g., MCS, MIMO rank, CE, etc.) of the base station and UE may be provided through multi-hypothesis blind decoding of one or more scheduled communications at a UE. In some cases, a UE may identify a plurality of sets of candidate configurations for scheduled communications based on channel conditions measured at the UE. For example, a first candidate set of decoding parameters may be selected at the UE based on measured channel conditions being above or below a threshold value, and a different candidate set of decoding parameters may be selected that correspond to a prior set of decoding parameters from before the UE provided a measurement report to switch sets of decoding parameters. The UE may blind decode each of the identified candidate sets of decoding parameters, and decode the corresponding communication. In some cases, the UE may perform such multi-hypothesis blind decoding for a transient time window following the transmission of a measurement report. Thus, the UE is less likely to fail to decode a communication in the event that the base station did not receive the measurement report. The length of the transient window may be predefined, or may be configured by the base station. For example, the transient time window may be based on a number of slots, a number of scheduled communication occasions (e.g. SPS occasions), an absolute time (e.g., in milliseconds), a frequency range, subcarrier spacing, or any combinations thereof.

Such techniques may provide that a UE and base station operating with scheduled communications can adjust communication parameters to provide efficient and reliable communications. Techniques as discussed herein may thus provide for efficient adjustment of communication parameters based on channel conditions without additional control signaling for instances of scheduled communications. Adjusting communication parameters may allow for enhanced efficiency and reliability of communications with reduced signaling overhead associated with particular instances of scheduled communications. Such techniques may thus enhance communications efficiency, increase data rates and reliability, and provide for enhanced user experience.

Aspects of the disclosure are initially described in the context of wireless communications systems. Aspects of the disclosure are further illustrated by and described with reference to process flows, apparatus diagrams, system diagrams, and flowcharts that relate to techniques for multi-hypothesis reception for scheduled communications.

FIG. 1 illustrates an example of a wireless communications system 100 that supports techniques for multi-hypothesis reception for scheduled communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a UE 115 and base station 105 may communicate using scheduled communications in which multiple different communication instances are scheduled, and separate control information is not provided for each communication instance. In some cases, different communication parameters (e.g., MCS, MIMO rank, CE procedures for decoding downlink SPS transmissions) for different communication instances may be selected based on one or more factors, such as channel conditions between the UE 115 and base station 105 (e.g., relatively poor channel conditions may use a set of communication parameters with a lower modulation order, and relatively good channel conditions may use a set of communication parameters with a higher modulation order).

In some cases, the base station 105 may provide the UE 115 with two or more sets of decoding parameters for scheduled communications, and a first set of decoding parameters may be selected at both the base station 105 and the UE 115 based at least in part on first channel conditions meeting a first threshold value. In the event that subsequent second channel conditions meet a second threshold value, the UE 115 and base station 105 may switch to a second set of decoding parameters from the two or more sets of decoding parameters. In some cases, the UE 115 may perform blind decoding for one or more scheduled communications subsequent to reporting the second channel conditions, where the blind decoding uses a first hypothesis for the first set of decoding parameters and a second hypothesis for the second set of decoding parameters. Such techniques provide that communication parameters may be adjusted based on channel conditions, and allow for successful decoding of a scheduled communication in the event that the transmitting base station 105 does not successfully receive the reporting of the second channel conditions. In some cases, the UE 115 may perform such multi-hypothesis blind decoding for a transient period following transmission of a measurement report that triggers a change in the set of decoding parameters.

Figure 2:
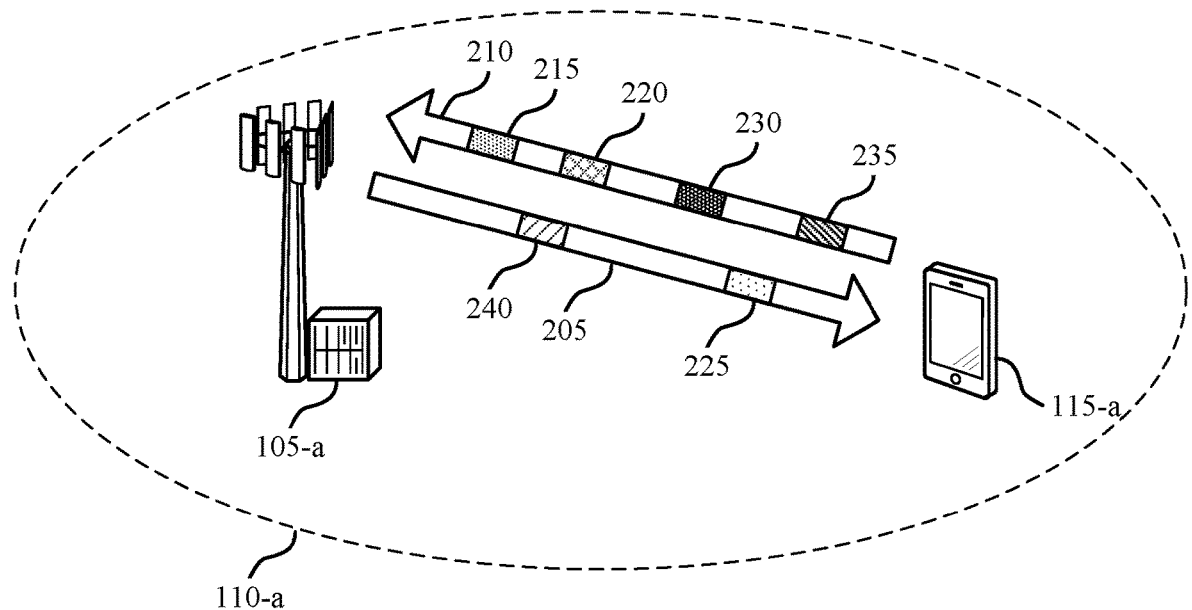

FIG. 2 illustrates an example of a wireless communications system 200 that supports techniques for multi-hypothesis reception for scheduled communications in accordance with aspects of the present disclosure. In some examples, wireless communications system 200 may implement aspects of wireless communications system 100. In the example of FIG. 2, wireless communications system 200 may include base station 105-a and UE 115-a, which may be examples of the corresponding devices described with respect to FIG. 1. Base station 105-a may provide network coverage for geographic coverage area 110-a. The base station 105-a may transmit downlink communications 205 to the UE 115-a, and the UE 115-a may transmit uplink communications 210 to the base station 105-a.

To support link adaptation for scheduled communications (e.g., CG or SPS communications) in which multiple communication instances may occur using wireless resources that are provided in control information, the UE 115-a and base station 105-a may select communication parameters based on one or more factors. In some cases, the base station 105-a may provide the UE 115-a with control information that indicates multiple sets of communication parameters. For example, each set of communication parameters may indicate a wireless resource allocation and a MCS for data transmissions, and different sets of communication parameters may provide different resource allocations, different MCSs, or both. The UE 115-a and base station 105-a may select a particular set of communication parameters based on one or more factors. In some cases, the selected set of communication parameters may be based on one or more channel measurements, such that the communication parameters are appropriate for current channel conditions between the UE 115-a and base station 105-a.

In the example of FIG. 2, the UE 115-a may transmit a first measurement report 215 to the base station 105-a. Based on one or more measured parameters reported in the first measurement report 215 (e.g., measured reference signal powers), the base station 105-a and UE 115-a may select one of the sets of communication parameters. For example, a first set of decoding parameters may include resource allocations (e.g., time and frequency resources) and MCS for coverage enhancement transmissions, and be selected when a reference signal received power (RSRP) or signal to interference and noise ratio (SINR) provided in the first measurement report 215 is below a threshold value. Based on the selected set of communication parameters, the UE 115-*a* may transmit (and the base station 105-*a* may receive) a first uplink communication 220, and the base station 105-*a* may transmit (and the UE 115-*a* may receive) a first downlink communication 225.

In some cases, the base station 105-*a* may transmit one or more reference signals (e.g., a channel state information reference signal (CSI-RS)) that may be measured at the UE 115-*a*, and a second measurement report 230 may be transmitted based on measurements of the one or more reference signals. In some cases, the second measurement report 230 may indicate that the one or more measured parameters are above a second threshold value (e.g., a measured RSRP is above the second threshold value) and the UE 115-*a* and base station 105-*a* may select a different set of communication parameters for a second uplink communication 235 and a second downlink communication 240. For example, the second measurement report 230 may indicate that channel conditions have improved sufficiently and that CE is no longer necessary, and a second set of decoding parameters may include resource allocations and MCS for regular, non-CE, communications (e.g., CE communications may have a lower modulation order and coding rate, with multiple repetitions transmitted, and regular non-CE communications may have a higher modulation order and coding rate, with fewer or no repetitions).

In some cases the second measurement report 230 may not be successfully received at the base station 105-*a* (e.g., due to a burst of interference between the UE 115-*a* and base station 105-*a*). In such cases, the UE 115-*a* may select the second set of decoding parameters for second downlink communications 240, but the base station 105-*a* may transmit using the first set of decoding parameters due to the failure to receive the second measurement report 230. Thus, in such cases, the UE 115-*a* may not be able to decode the second downlink communications 240, resulting in a failure of the communication that may prompt one or more retransmissions, and increase latency and power consumption. In accordance with various techniques as discussed herein, the UE 115-*a* may perform blind decoding for multiple possible decoding parameter sets subsequent to transmission of the second measurement report 230.

In some cases, the UE 115-*a* may perform multi-hypothesis blind decoding for a duration of a transient window when switching from one decoding parameter set to a different decoding parameter set based on a measurement report. In some cases, the transient window may be a preconfigured time window (e.g., a predetermined number of SPS occasions, a predetermined number of radio frames/subframes/slots, a predetermined time duration (e.g., measured in milliseconds), or any combinations thereof), or may be configured by the base station 105-*a* (e.g., as part of a SPS configuration). In some cases, the length of transient window may be dependent on a frequency range, subcarrier spacing (SCS), or both, of the scheduled communications (e.g., a first frequency range or SCS may be more vulnerable to interference and have a longer transient window, and a second frequency range or SCS may be more robust against interference and have a shorter transient window). In some cases, transient window may be valid until the UE 115-*a* receives a confirmation of the new configuration from the base station 105-*a* (e.g., in a MAC-CE or SCI, which may be in a SPS transmission). In some cases, if the second downlink communication 240 is successfully decoded using a decoding hypothesis associated with the second set of decoding parameters, the UE 115-*a* may determine that the base station 105-*a* has switched communications parameters based on the second measurement report 230, and may discontinue the multi-hypothesis blind decoding.

Figure 3:
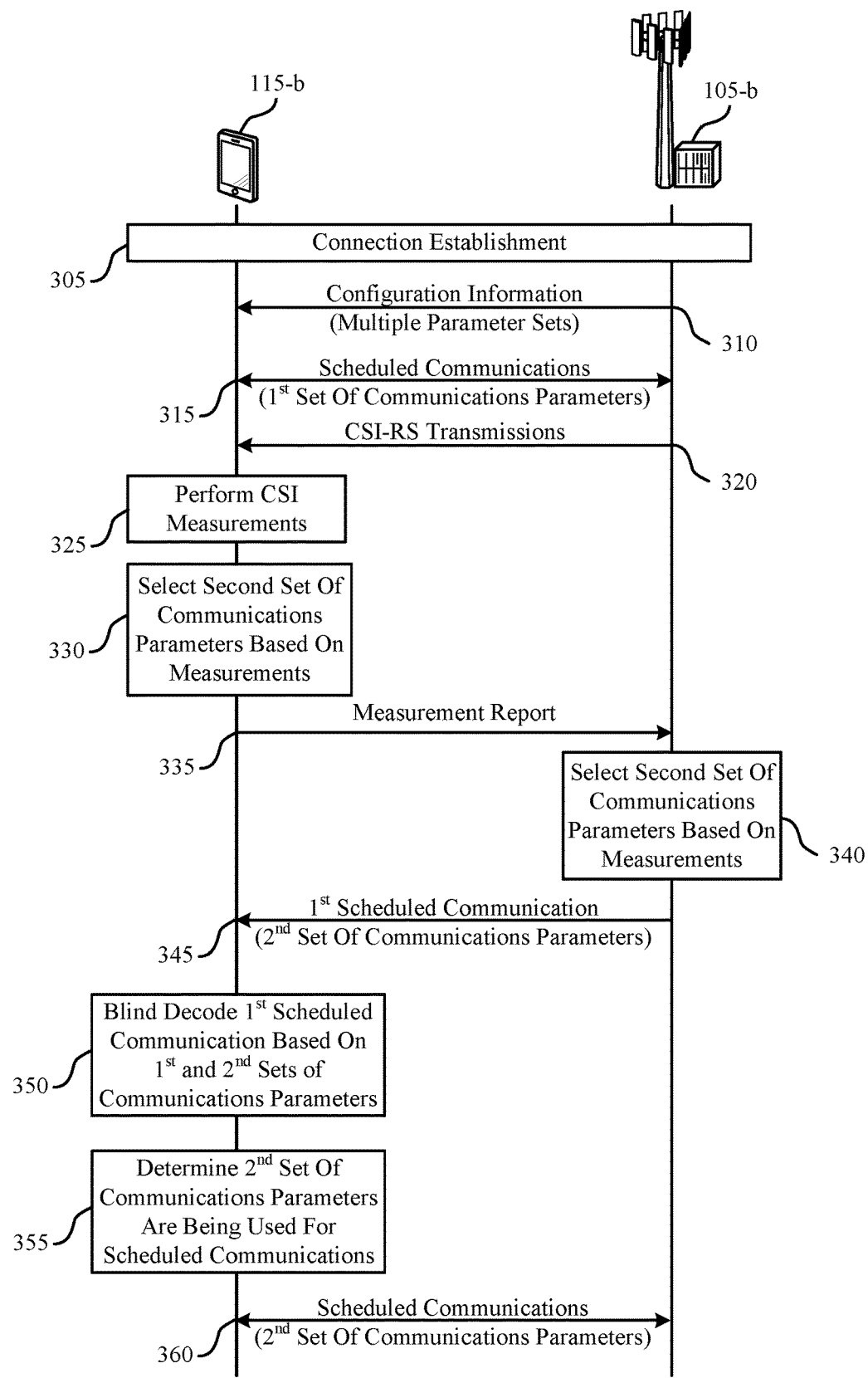
FIG. 3 illustrates an example of a process flow that supports techniques for multi-hypothesis reception for scheduled communications in accordance with aspects of the present disclosure.

FIG. 3 illustrates an example of a process flow 300 that supports techniques for multi-hypothesis reception for scheduled communications in accordance with aspects of the present disclosure. The process flow 300 may implement or be implemented by aspects of the wireless communications systems 100 or 200. For example, the process flow 300 may include a UE 115-*b* and a base station 105-*b*, which may be examples of corresponding devices described with reference to FIGS. 1 and 2. In the following description of the process flow 300, operations between the UE 115-*b* and the base station 105-*b* may be performed in a different order or at a different time than as shown. Additionally or alternatively, some operations may be omitted from the process flow 300, and other operations may be added to the process flow 300. In accordance with the process flow 300, the UE 115-*b* and base station 105-*b* may communicate using a set of communication parameters that are selected based on channel conditions.

At 305, the UE 115-*b* and base station 105-*b* may perform a connection establishment procedure. In some cases, the connection establishment procedure may be an RRC connection establishment or reestablishment procedure that is performed in accordance with known techniques. In some cases, as part of the connection establishment procedure, the UE 115-*b* may transmit a capability message to the base station 105-*b* that indicates a capability of the UE 115-*b* to select communication parameters in scheduled communications based on channel conditions, and that the UE 115-*b* can perform multi-hypothesis blind decoding procedures.

At 310, the base station 105-*b* may transmit control signaling to the UE 115-*b* with configuration information for scheduled communications (e.g., CG and/or SPS communications). In some cases, the control signaling may include two or more sets of communication parameters, and one or more threshold values for selection of different sets of communication parameters. In some cases, the control signaling may be transmitted to the UE 115-*b* in RRC signaling, in downlink control information (DCI), in a MAC-CE, or any combinations thereof.

At 315, the base station 105-*b* and UE 115-*b* may exchange scheduled communications in accordance with the configured communications parameters. In some cases, a first set of communications parameters may be used for such scheduled communications, including a first set of decoding parameters that the UE 115-*b* may use to decode downlink SPS transmissions that are transmitted as part of the scheduled communications. At 320, the base station 105-*b* may transmit one or more reference signals, such as CSI-RSs. At 325, the UE 115-*b* may perform measurements of the one or more reference signals, such as CSI measurements of CSI-RSs.

At 330, the UE 115-*b* may select a second set of communication parameters based on one or more CSI measurements. For example, the UE 115-*b* may measure a RSRP of a CSI-RS and determine that the RSRP is above a first threshold value that is configured for a first set of communication parameters. Based on the measured RSRP value and the first threshold value, the UE 115-*b* may select the second set of communication parameters, including a second set of decoding parameters. At 335, the UE 115-*b* may transmit a measurement report to the base station 105-b. At 340, the base station 105-b may select the second set of communication parameters based on the reported CSI measurements and the first threshold value. At 345, the base station 105-b may transmit a first scheduled communication (e.g., a first downlink SPS transmission subsequent to the measurement report) to the UE 115-b based on the second set of communication parameters.

At 350, the UE 115-b may blind decode the first scheduled communication using both the first set of communication parameters and the second set of communication parameters. Thus, the UE 115-b may successfully decode the first scheduled communication irrespective of whether the base station 105-b successfully received the measurement report and switched to the second set of communication parameters. In some cases, in the event that the UE 115-b determines that the first set of communication parameters were used, the UE 115-b may continue the multi-hypothesis blind decoding using both sets of communication parameters for at least one more downlink transmission. In some cases, in the event that the UE 115-b determines that the first set of communication parameters were used, the UE 115-b may retransmit the measurement report.

In the example of FIG. 3, at 355, the UE 115-b may determine that the second set of communication parameters are being used for scheduled communications (e.g., based on the blind decoding hypothesis associated with the second set of communication parameters successfully decoding the first scheduled communication). At 360, the UE 115-b and the base station 105-b may transmit and receive one or more instances of the scheduled communications based on the second set of communication parameters. Such operations may continue with the UE 115-b measuring reference signals from the base station 105-b, and the UE 115-b and base station 105-b switching sets of communication parameters and performing multi-hypothesis blind decoding as needed based on reported measurements.

As discussed with reference to various examples herein, in some cases the multi-hypothesis blind decoding may be performed during a transient window subsequent to transmission of a measurement report that prompts a change in the set of communication parameters. While various examples discussed herein describe two sets of communication parameters, techniques as discussed herein may be used for any number of sets of communication parameters based on respective ranges of one or more channel measurements. Further, while various examples discussed herein describe multi-hypothesis blind decoding for downlink SPS communications between base stations and UEs, such technique may be used for any types of communications that may use dynamic link adaptation based on measurement reports (e.g., sidelink communications between UEs).

Figure 4:
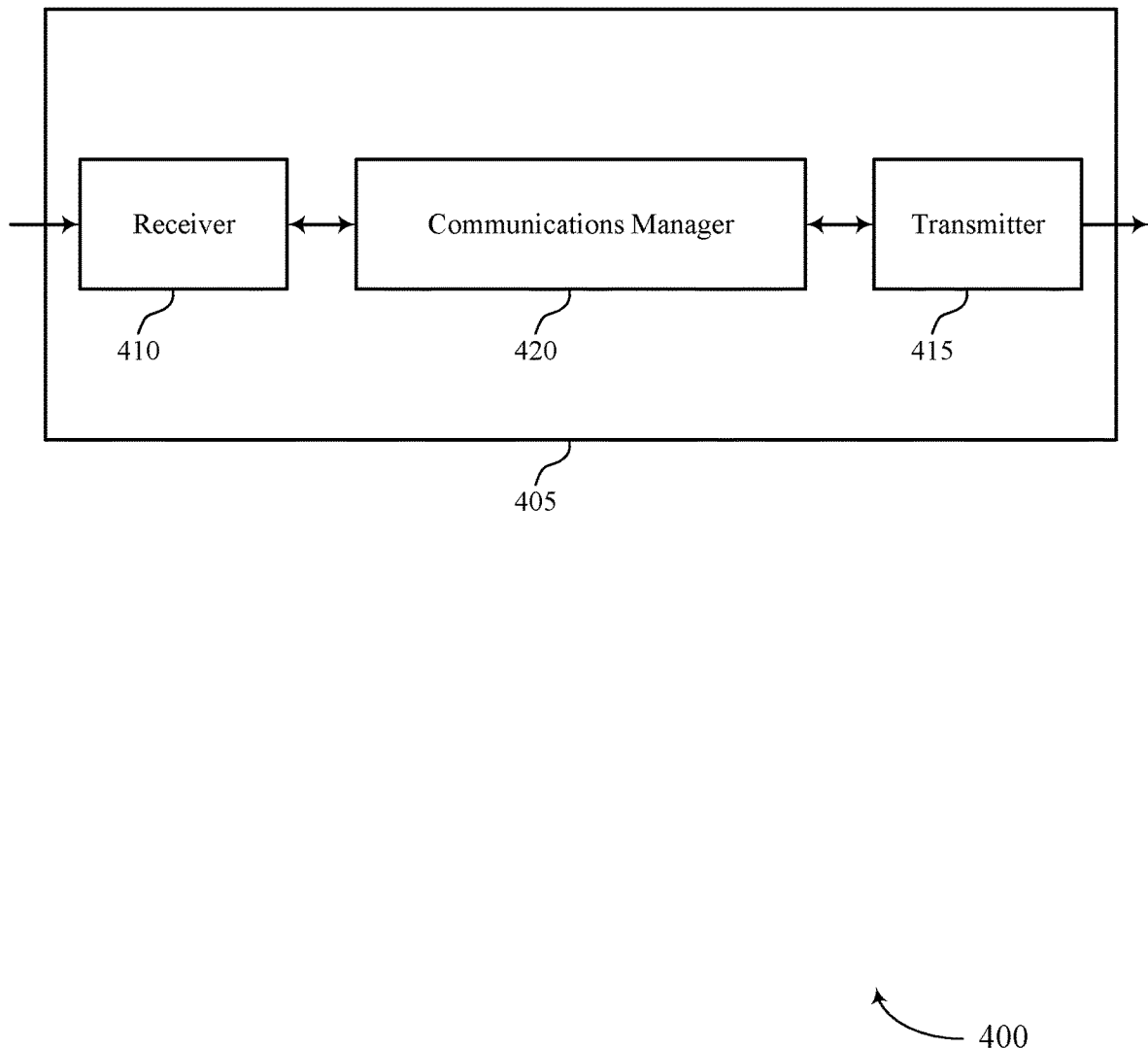
FIGS. 4 and 5 show block diagrams of devices that support techniques for multi-hypothesis reception for scheduled communications in accordance with aspects of the present disclosure.

FIG. 4 shows a block diagram 400 of a device 405 that supports techniques for multi-hypothesis reception for scheduled communications in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for multi-hypothesis reception for scheduled communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for multi-hypothesis reception for scheduled communications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for multi-hypothesis reception for scheduled communications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, an indication of a set of multiple sets of decoding parameters for a set of multiple scheduled communications between the UE and the base station. The communications manager 420 may be configured as or otherwise support a means for identifying a set of multiple candidate sets of decoding parameters from the set of multiple sets of decoding parameters based on a first set of channel conditions between the UE and the base station. The communications manager 420 may be configured as or otherwise support a means for identifying, based on blind decoding at least a first scheduled communication using each of the set of multiple candidate sets of decoding parameters, a first candidate set of decoding parameters of the set of multiple candidate sets of decoding parameters is used for at least the first scheduled communication. The communications manager 420 may be configured as or otherwise support a means for communicating with the base station according to the first candidate set of decoding parameters for one or more of the set of multiple scheduled communications.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for efficient adjustment of communication parameters based on channel conditions, in which reliability may be maintained in the event of a measurement report is not received. Adjusting communication parameters may allow for enhanced efficiency and reliability of communications with reduced signaling overhead associated with particular instances of scheduled communications. Such techniques may thus enhance communications efficiency, increase data rates and reliability, decrease power consumption, and provide for enhanced user experience.

Figure 5:
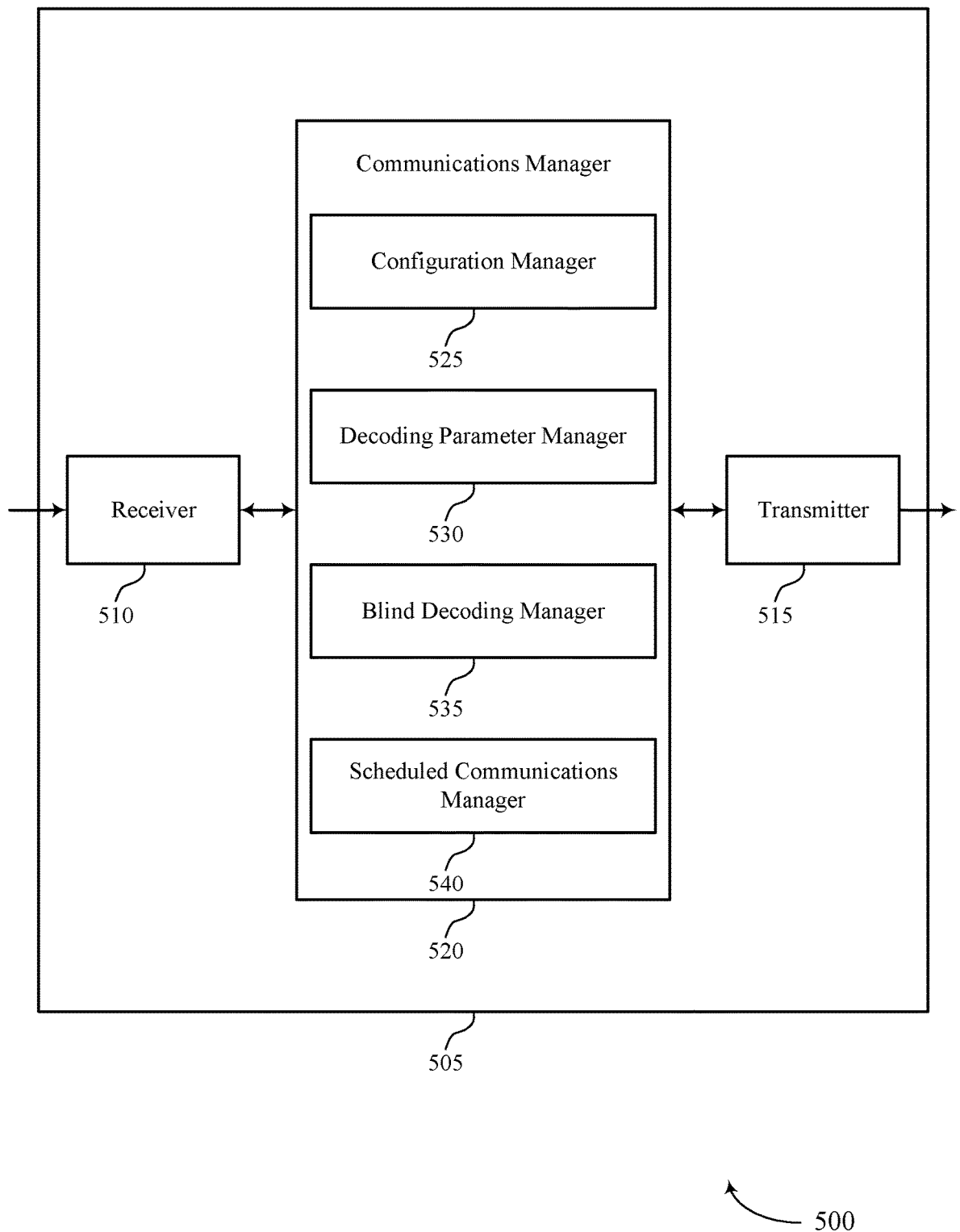

FIG. 5 shows a block diagram 500 of a device 505 that supports techniques for multi-hypothesis reception for scheduled communications in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for multi-hypothesis reception for scheduled communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for multi-hypothesis reception for scheduled communications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for multi-hypothesis reception for scheduled communications as described herein. For example, the communications manager 520 may include a configuration manager 525, a decoding parameter manager 530, a blind decoding manager 535, a scheduled communications manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The configuration manager 525 may be configured as or otherwise support a means for receiving, from a base station, an indication of a set of multiple sets of decoding parameters for a set of multiple scheduled communications between the UE and the base station. The decoding parameter manager 530 may be configured as or otherwise support a means for identifying a set of multiple candidate sets of decoding parameters from the set of multiple sets of decoding parameters based on a first set of channel conditions between the UE and the base station. The blind decoding manager 535 may be configured as or otherwise support a means for identifying, based on blind decoding at least a first scheduled communication using each of the set of multiple candidate sets of decoding parameters, a first candidate set of decoding parameters of the set of multiple candidate sets of decoding parameters is used for at least the first scheduled communication. The scheduled communications manager 540 may be configured as or otherwise support a means for communicating with the base station according to the first candidate set of decoding parameters for one or more of the set of multiple scheduled communications.

Figure 6:
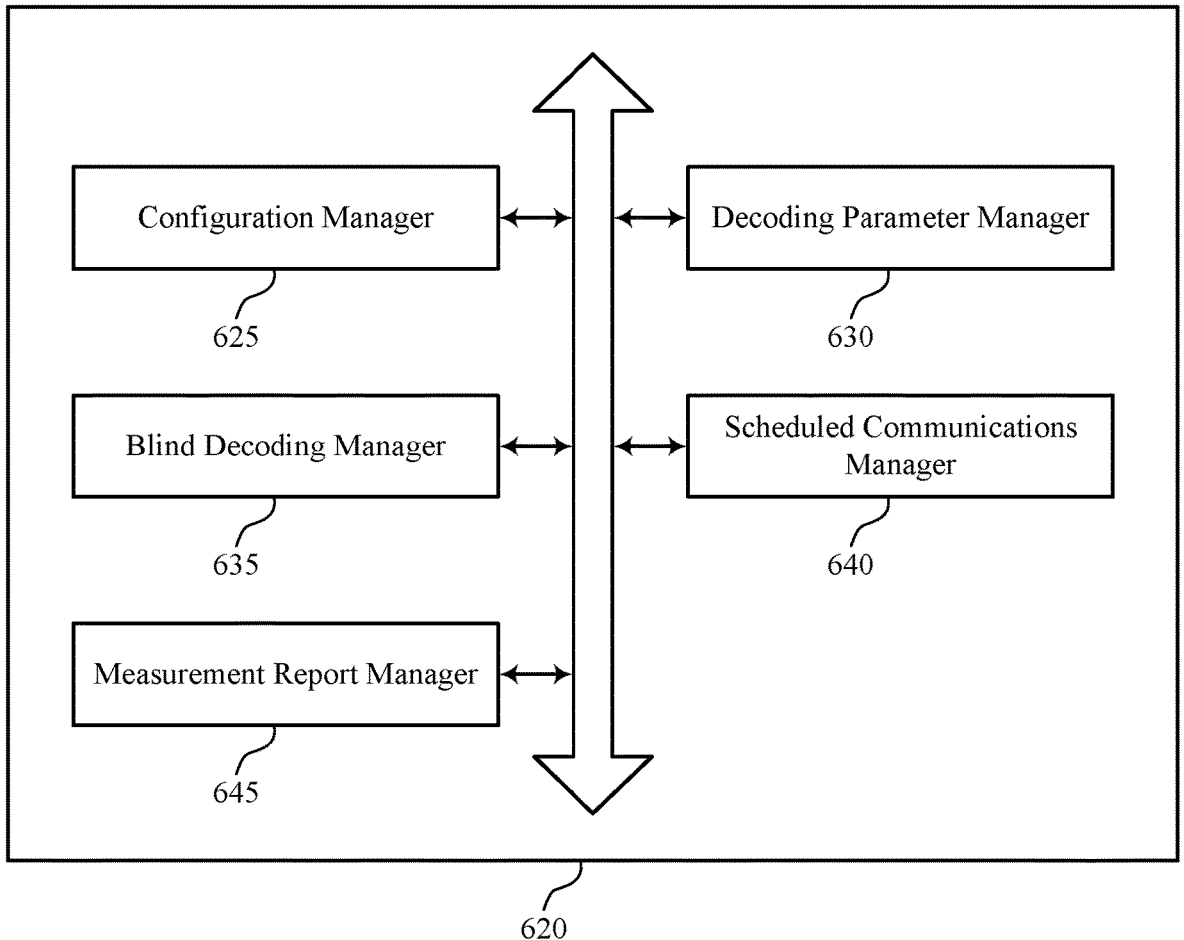
FIG. 6 shows a block diagram of a communications manager that supports techniques for multi-hypothesis reception for scheduled communications in accordance with aspects of the present disclosure.

FIG. 6 shows a block diagram 600 of a communications manager 620 that supports techniques for multi-hypothesis reception for scheduled communications in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for multi-hypothesis reception for scheduled communications as described herein. For example, the communications manager 620 may include a configuration manager 625, a decoding parameter manager 630, a blind decoding manager 635, a scheduled communications manager 640, a measurement report manager 645, or any combination thereof. Each of these components may communicate, directly or indirectly, with one another (e.g., via one or more buses).

The communications manager 620 may support wireless communication at a UE in accordance with examples as disclosed herein. The configuration manager 625 may be configured as or otherwise support a means for receiving, from a base station, an indication of a set of multiple sets of decoding parameters for a set of multiple scheduled communications between the UE and the base station. The decoding parameter manager 630 may be configured as or otherwise support a means for identifying a set of multiple candidate sets of decoding parameters from the set of multiple sets of decoding parameters based on a first set of channel conditions between the UE and the base station. The blind decoding manager 635 may be configured as or otherwise support a means for identifying, based on blind decoding at least a first scheduled communication using each of the set of multiple candidate sets of decoding parameters, a first candidate set of decoding parameters of the set of multiple candidate sets of decoding parameters is used for at least the first scheduled communication. The scheduled communications manager 640 may be configured as or otherwise support a means for communicating with the base station according to the first candidate set of decoding parameters for one or more of the set of multiple scheduled communications.

In some examples, the blind decoding manager 635 may be configured as or otherwise support a means for determining a transient window during which blind decoding using each of the set of multiple candidate sets of decoding parameters is to be performed, where the blind decoding is performed for one or more scheduled communications occasions within the transient window.

In some examples, the measurement report manager 645 may be configured as or otherwise support a means for transmitting a measurement report to the base station that indicates the first set of channel conditions, and where the transient window is started responsive to transmission of the measurement report. In some examples, a length of the transient window is predetermined or indicated by the base station in configuration signaling. In some examples, the length of the transient window corresponds to a number of slots, an absolute time period, a number of instances of the set of multiple scheduled communications, a frequency range used for the set of multiple scheduled communications, a subcarrier spacing of the set of multiple scheduled communications, or any combinations thereof. In some examples, the length of the transient window corresponds to a time period until the UE receives a confirmation of a change in decoding parameters from the base station.

In some examples, the decoding parameter manager 630 may be configured as or otherwise support a means for receiving, from the base station, a confirmation that the first candidate set of decoding parameters is to be used for the set of multiple scheduled communications, the confirmation provided in a MAC-CE, in DCI, in one of the set of multiple scheduled communications, or based on successful decoding of the first scheduled communication using the first candidate set of decoding parameters.

In some examples, to support receiving, the configuration manager 625 may be configured as or otherwise support a means for receiving a set of multiple different sets of resources, transmission parameters, or any combinations thereof, that are mapped to different sets of channel conditions, and where the set of multiple candidate sets of decoding parameters include the first candidate set of decoding parameters that are mapped to the first set of channel conditions, and a second candidate set of decoding parameters used for one or more scheduled communications prior to the first scheduled communication.

In some examples, the set of multiple sets of decoding parameters provide different time resources, different frequency resources, different modulation and coding schemes, different MIMO ranks, different numbers of repetitions, different frequency hopping among multiple repetitions, or any combinations thereof, and where each of the set of multiple sets of decoding parameters have an associated range of measured channel conditions. In some examples, the measured channel conditions include one or more of a channel quality indicator, a reported layer-one (L1) RSRP, a L1 SINR, or any combinations thereof. In some examples, the set of multiple sets of decoding parameters include two or more sets of SPS parameters for downlink SPS transmissions from the base station.

Figure 7:
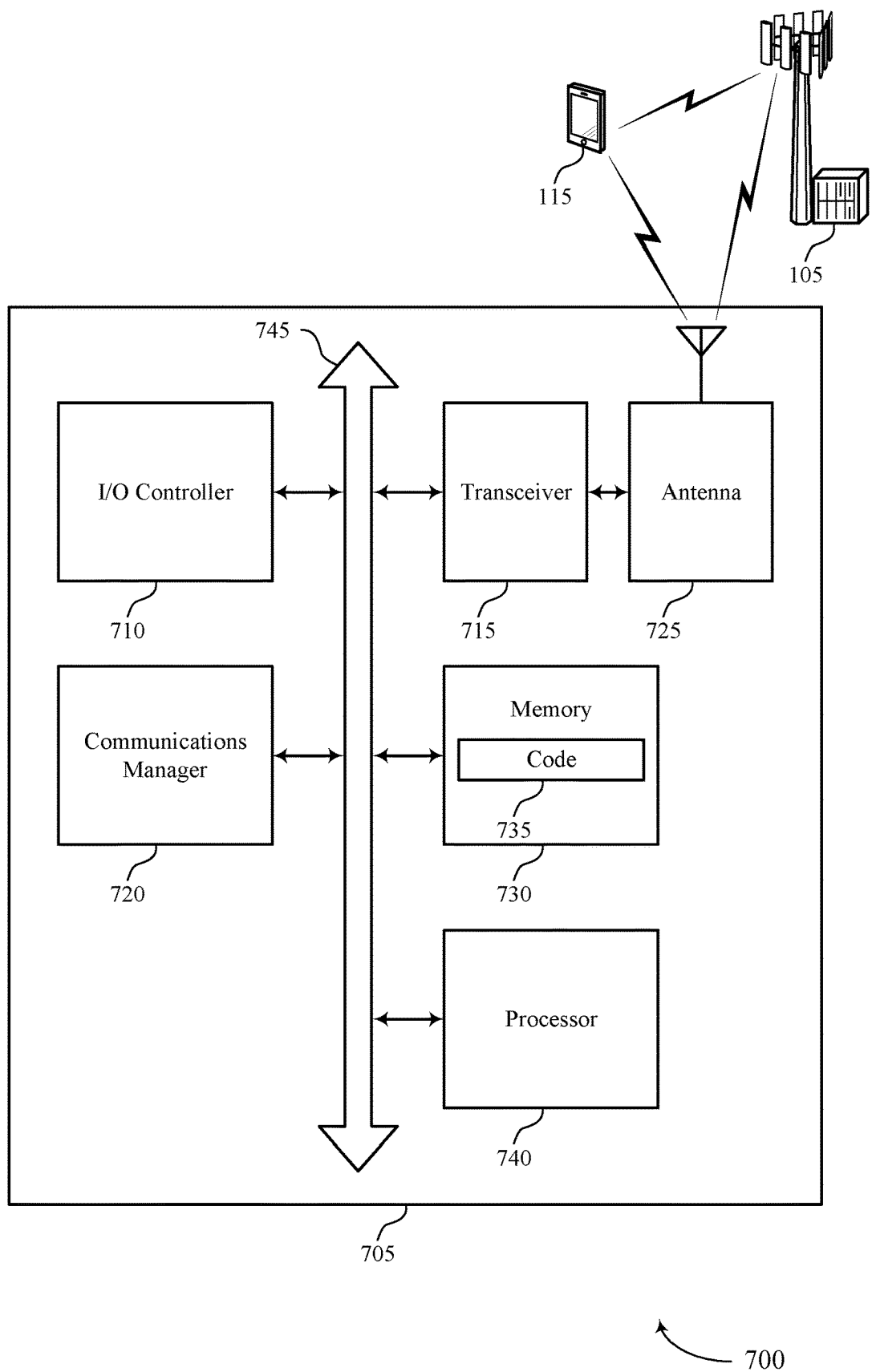
FIG. 7 shows a diagram of a system including a device that supports techniques for multi-hypothesis reception for scheduled communications in accordance with aspects of the present disclosure.

FIG. 7 shows a diagram of a system 700 including a device 705 that supports techniques for multi-hypothesis reception for scheduled communications in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for multi-hypothesis reception for scheduled communications). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, an indication of a set of multiple sets of decoding parameters for a set of multiple scheduled communications between the UE and the base station. The communications manager 720 may be configured as or otherwise support a means for identifying a set of multiple candidate sets of decoding parameters from the set of multiple sets of decoding parameters based on a first set of channel conditions between the UE and the base station. The communications manager 720 may be configured as or otherwise support a means for identifying, based on blind decoding at least a first scheduled communication using each of the set of multiple candidate sets of decoding parameters, a first candidate set of decoding parameters of the set of multiple candidate sets of decoding parameters is used for at least the first scheduled communication. The communications manager 720 may be configured as or otherwise support a means for communicating with the base station according to the first candidate set of decoding parameters for one or more of the set of multiple scheduled communications.

By including or configuring the communications manager 720 in accordance with examples as described herein, the device 705 may support techniques for efficient adjustment of communication parameters based on channel conditions, in which reliability may be maintained in the event of a measurement report is not received. Adjusting communication parameters may allow for enhanced efficiency and reliability of communications with reduced signaling overhead associated with particular instances of scheduled communications. Such techniques may thus enhance communications efficiency, increase data rates and reliability, decrease power consumption, and provide for enhanced user experience.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for multi-hypothesis reception for scheduled communications as described herein, or the processor 740 and the memory 730 may be otherwise configured to perform or support such operations.

Figure 8:
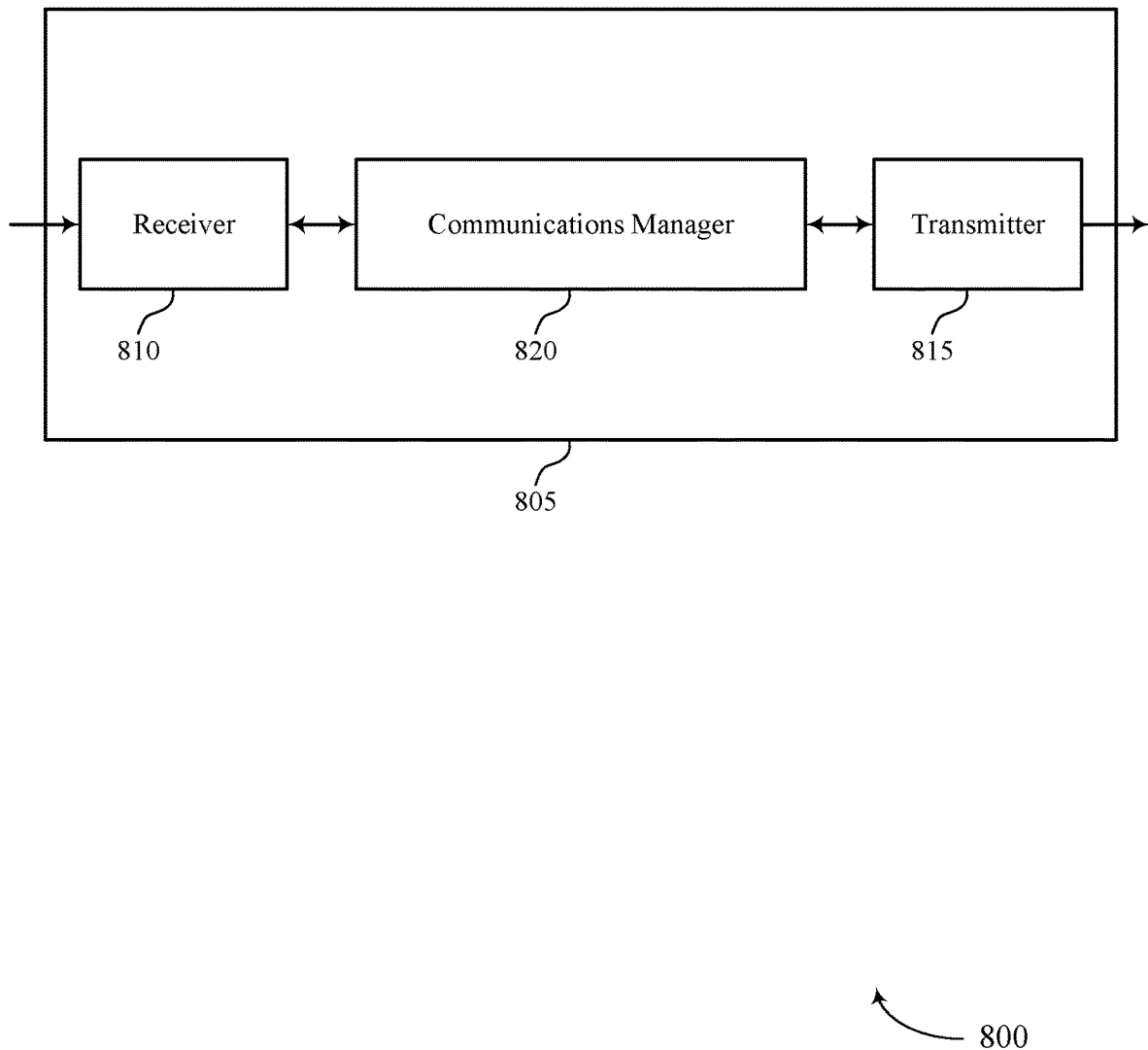
FIGS. 8 and 9 show block diagrams of devices that support techniques for multi-hypothesis reception for scheduled communications in accordance with aspects of the present disclosure.

FIG. 8 shows a block diagram 800 of a device 805 that supports techniques for multi-hypothesis reception for scheduled communications in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for multi-hypothesis reception for scheduled communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for multi-hypothesis reception for scheduled communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for multi-hypothesis reception for scheduled communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications. The communications manager 820 may be configured as or otherwise support a means for receiving, from the UE, a measurement report that indicates the first set of channel conditions between the UE and the base station meeting a threshold value. The communications manager 820 may be configured as or otherwise support a means for selecting, based on the first set of channel conditions, a first set of decoding parameters from the set of multiple sets of decoding parameters. The communications manager 820 may be configured as or otherwise support a means for transmitting one or more of the set of multiple scheduled communications to the UE based on the first set of decoding parameters.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for efficient adjustment of communication parameters based on channel conditions, in which reliability may be maintained in the event of a measurement report is not received. Adjusting communication parameters may allow for enhanced efficiency and reliability of communications with reduced signaling overhead associated with particular instances of scheduled communications. Such techniques may thus enhance communications efficiency, increase data rates and reliability, decrease power consumption, and provide for enhanced user experience.

Figure 9:
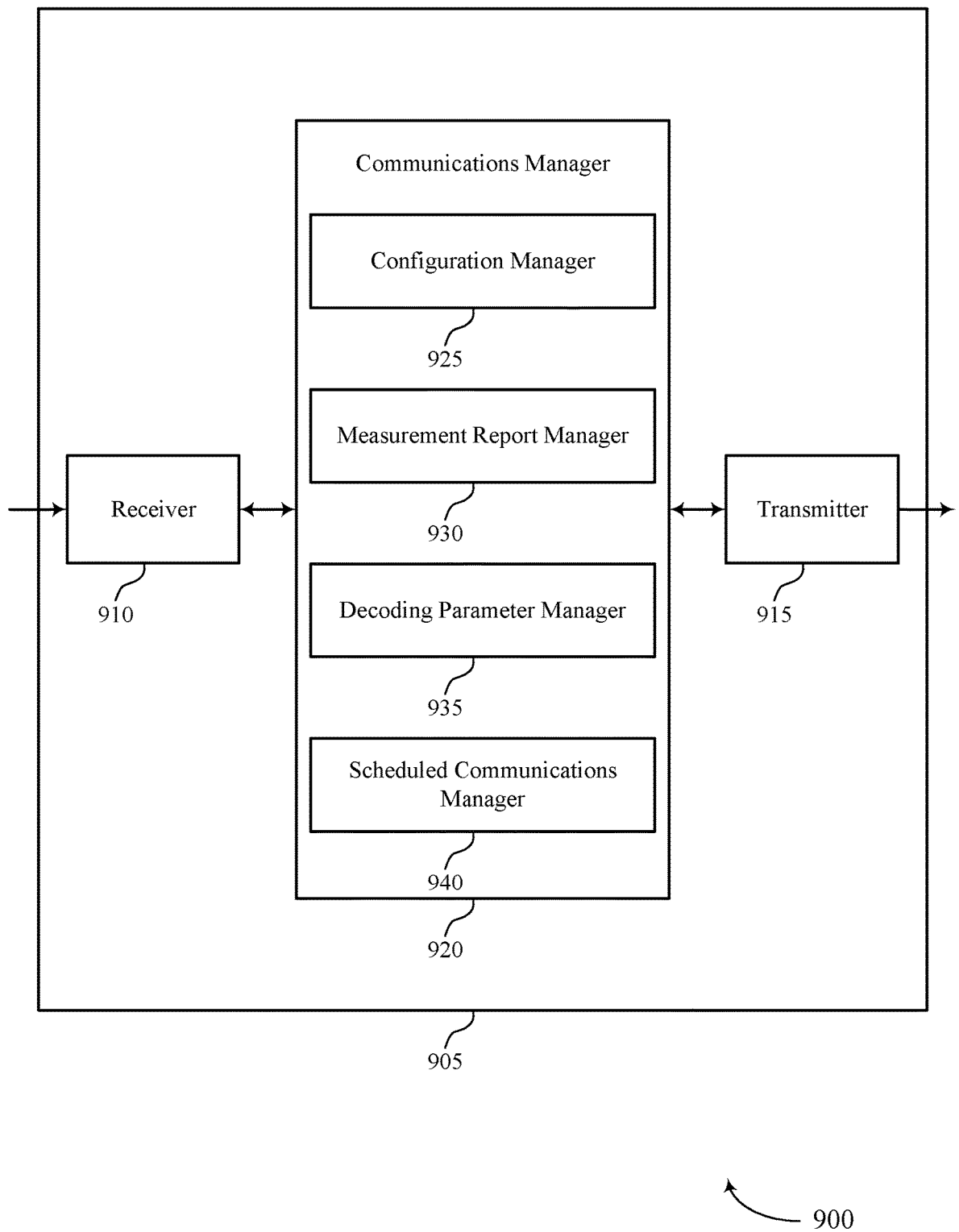

FIG. 9 shows a block diagram 900 of a device 905 that supports techniques for multi-hypothesis reception for scheduled communications in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for multi-hypothesis reception for scheduled communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for multi-hypothesis reception for scheduled communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for multi-hypothesis reception for scheduled communications as described herein. For example, the communications manager 920 may include a configuration manager 925, a measurement report manager 930, a decoding parameter manager 935, a scheduled communications manager 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The configuration manager 925 may be configured as or otherwise support a means for transmitting, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications. The measurement report manager 930 may be configured as or otherwise support a means for receiving, from the UE, a measurement report that indicates the first set of channel conditions between the UE and the base station meeting a threshold value. The decoding parameter manager 935 may be configured as or otherwise support a means for selecting, based on the first set of channel conditions, a first set of decoding parameters from the set of multiple sets of decoding parameters. The scheduled communications manager 940 may be configured as or otherwise support a means for transmitting one or more of the set of multiple scheduled communications to the UE based on the first set of decoding parameters.

Figure 10:
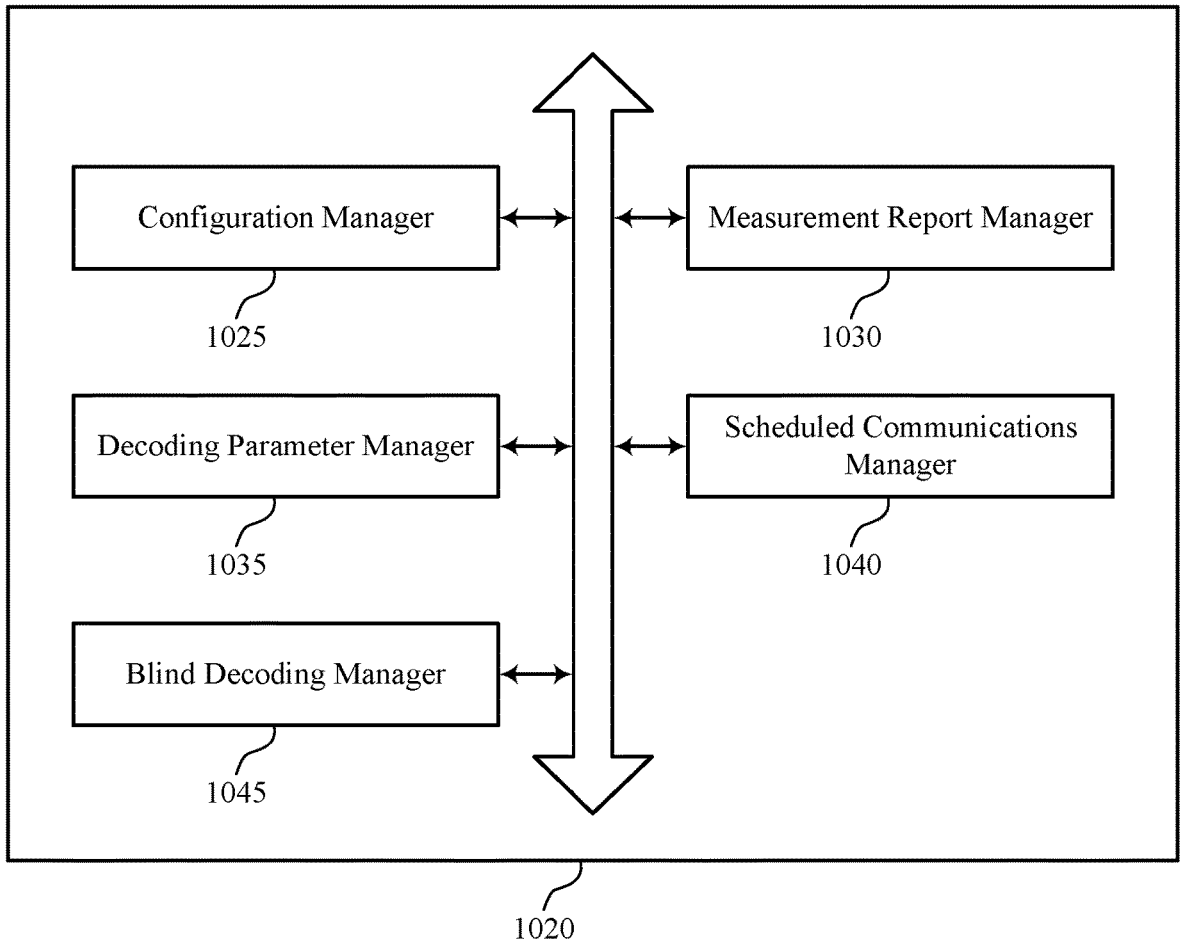
FIG. 10 shows a block diagram of a communications manager that supports techniques for multi-hypothesis reception for scheduled communications in accordance with aspects of the present disclosure.

FIG. 10 shows a block diagram 1000 of a communications manager 1020 that supports techniques for multi-hypothesis reception for scheduled communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for multi-hypothesis reception for scheduled communications as described herein. For example, the communications manager 1020 may include a configuration manager 1025, a measurement report manager 1030, a decoding parameter manager 1035, a scheduled communications manager 1040, a blind decoding manager 1045, or any combination thereof. Each of these components may communicate, directly or indirectly, with one another (e.g., via one or more buses).

The communications manager 1020 may support wireless communication at a base station in accordance with examples as disclosed herein. The configuration manager 1025 may be configured as or otherwise support a means for transmitting, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications. The measurement report manager 1030 may be configured as or otherwise support a means for receiving, from the UE, a measurement report that indicates the first set of channel conditions between the UE and the base station meeting a threshold value. The decoding parameter manager 1035 may be configured as or otherwise support a means for selecting, based on the first set of channel conditions, a first set of decoding parameters from the set of multiple sets of decoding parameters. The scheduled communications manager 1040 may be configured as or otherwise support a means for transmitting one or more of the set of multiple scheduled communications to the UE based on the first set of decoding parameters.

In some examples, the blind decoding manager 1045 may be configured as or otherwise support a means for configuring the UE with a transient window during which the UE is to blind decode one or more of the set of multiple scheduled communications using each of the set of multiple candidate sets of decoding parameters. In some examples, the transient window is started responsive to transmission of the measurement report. In some examples, a length of the transient window is predetermined or indicated to the UE in configuration signaling. In some examples, the length of the transient window corresponds to a number of slots, an absolute time period, a number of instances of the set of multiple scheduled communications, a frequency range used for the set of multiple scheduled communications, a subcarrier spacing of the set of multiple scheduled communications, or any combinations thereof. In some examples, the length of the transient window corresponds to a time period until the UE receives a confirmation of a change in decoding parameters from the base station.

In some examples, the decoding parameter manager 1035 may be configured as or otherwise support a means for transmitting, to the UE, a confirmation that the first set of decoding parameters is to be used for the set of multiple scheduled communications, the confirmation provided in a MAC-CE, in DCI, in one of the set of multiple scheduled communications, or based on successful decoding of the one or more of the set of multiple scheduled communications using the first set of decoding parameters.

In some examples, the configuration information includes a set of multiple different sets of resources, transmission parameters, or any combinations thereof, that are mapped to different sets of channel conditions, and where the set of multiple candidate sets of decoding parameters include the first set of decoding parameters that are mapped to the first set of channel conditions. In some examples, the set of multiple sets of decoding parameters provide different time resources, different frequency resources, different modulation and coding schemes, different MIMO ranks, different numbers of repetitions, different frequency hopping among multiple repetitions, or any combinations thereof, and where each of the set of multiple sets of decoding parameters have an associated range of measured channel conditions. In some examples, the measured channel conditions include one or more of a channel quality indicator, a reported L1RSRP, a L1 SINR, or any combinations thereof. In some examples, the set of multiple sets of decoding parameters include two or more sets of SPS parameters for downlink SPS transmissions from the base station.

Figure 11:
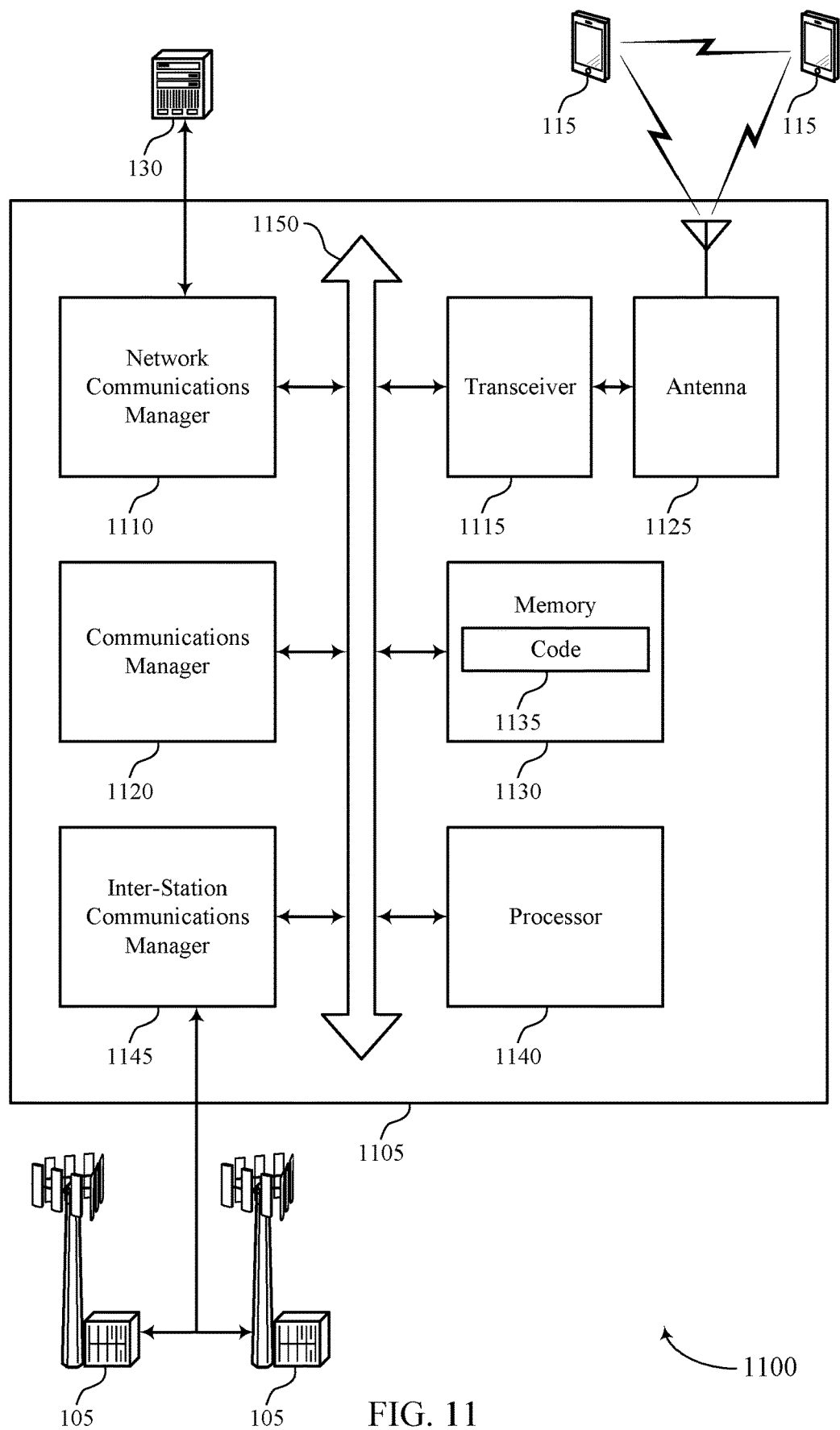
FIG. 11 shows a diagram of a system including a device that supports techniques for multi-hypothesis reception for scheduled communications in accordance with aspects of the present disclosure.

FIG. 11 shows a diagram of a system 1100 including a device 1105 that supports techniques for multi-hypothesis reception for scheduled communications in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for multi-hypothesis reception for scheduled communications). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications. The communications manager 1120 may be configured as or otherwise support a means for receiving, from the UE, a measurement report that indicates the first set of channel conditions between the UE and the base station meeting a threshold value. The communications manager 1120 may be configured as or otherwise support a means for selecting, based on the first set of channel conditions, a first set of decoding parameters from the set of multiple sets of decoding parameters. The communications manager 1120 may be configured as or otherwise support a means for transmitting one or more of the set of multiple scheduled communications to the UE based on the first set of decoding parameters.

By including or configuring the communications manager 1120 in accordance with examples as described herein, the device 1105 may support techniques for efficient adjustment of communication parameters based on channel conditions, in which reliability may be maintained in the event of a measurement report is not received. Adjusting communication parameters may allow for enhanced efficiency and reliability of communications with reduced signaling overhead associated with particular instances of scheduled communications. Such techniques may thus enhance communications efficiency, increase data rates and reliability, decrease power consumption, and provide for enhanced user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for multi-hypothesis reception for scheduled communications as described herein, or the processor 1140 and the memory 1130 may be otherwise configured to perform or support such operations.

Figure 12:
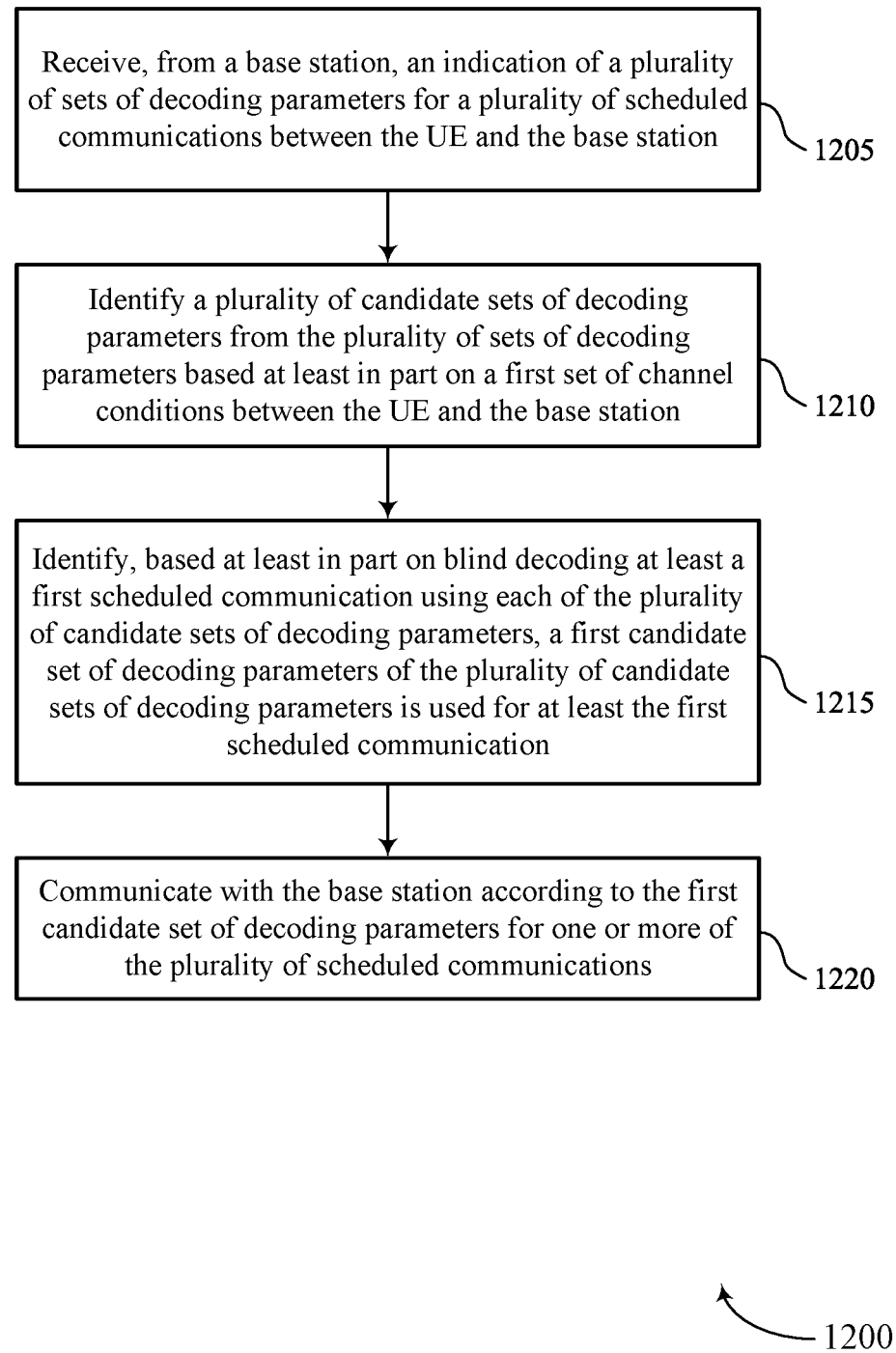
FIGS. 12 through 16 show flowcharts illustrating methods that support techniques for multi-hypothesis reception for scheduled communications in accordance with aspects of the present disclosure.

FIG. 12 shows a flowchart illustrating a method 1200 that supports techniques for multi-hypothesis reception for scheduled communications in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, an indication of a set of multiple sets of decoding parameters for a set of multiple scheduled communications between the UE and the base station. The operations of 1205 may be performed in accordance with examples as disclosed herein. In some examples, aspects of the operations of 1205 may be performed by a configuration manager 625 as described with reference to FIG. 6.

At 1210, the method may include identifying a set of multiple candidate sets of decoding parameters from the set of multiple sets of decoding parameters based on a first set of channel conditions between the UE and the base station. The operations of 1210 may be performed in accordance with examples as disclosed herein. In some examples, aspects of the operations of 1210 may be performed by a decoding parameter manager 630 as described with reference to FIG. 6.

At 1215, the method may include identifying, based on blind decoding at least a first scheduled communication using each of the set of multiple candidate sets of decoding parameters, a first candidate set of decoding parameters of the set of multiple candidate sets of decoding parameters is used for at least the first scheduled communication. The operations of 1215 may be performed in accordance with examples as disclosed herein. In some examples, aspects of the operations of 1215 may be performed by a blind decoding manager 635 as described with reference to FIG. 6.

At 1220, the method may include communicating with the base station according to the first candidate set of decoding parameters for one or more of the set of multiple scheduled communications. The operations of 1220 may be performed in accordance with examples as disclosed herein. In some examples, aspects of the operations of 1220 may be performed by a scheduled communications manager 640 as described with reference to FIG. 6.

Figure 13:
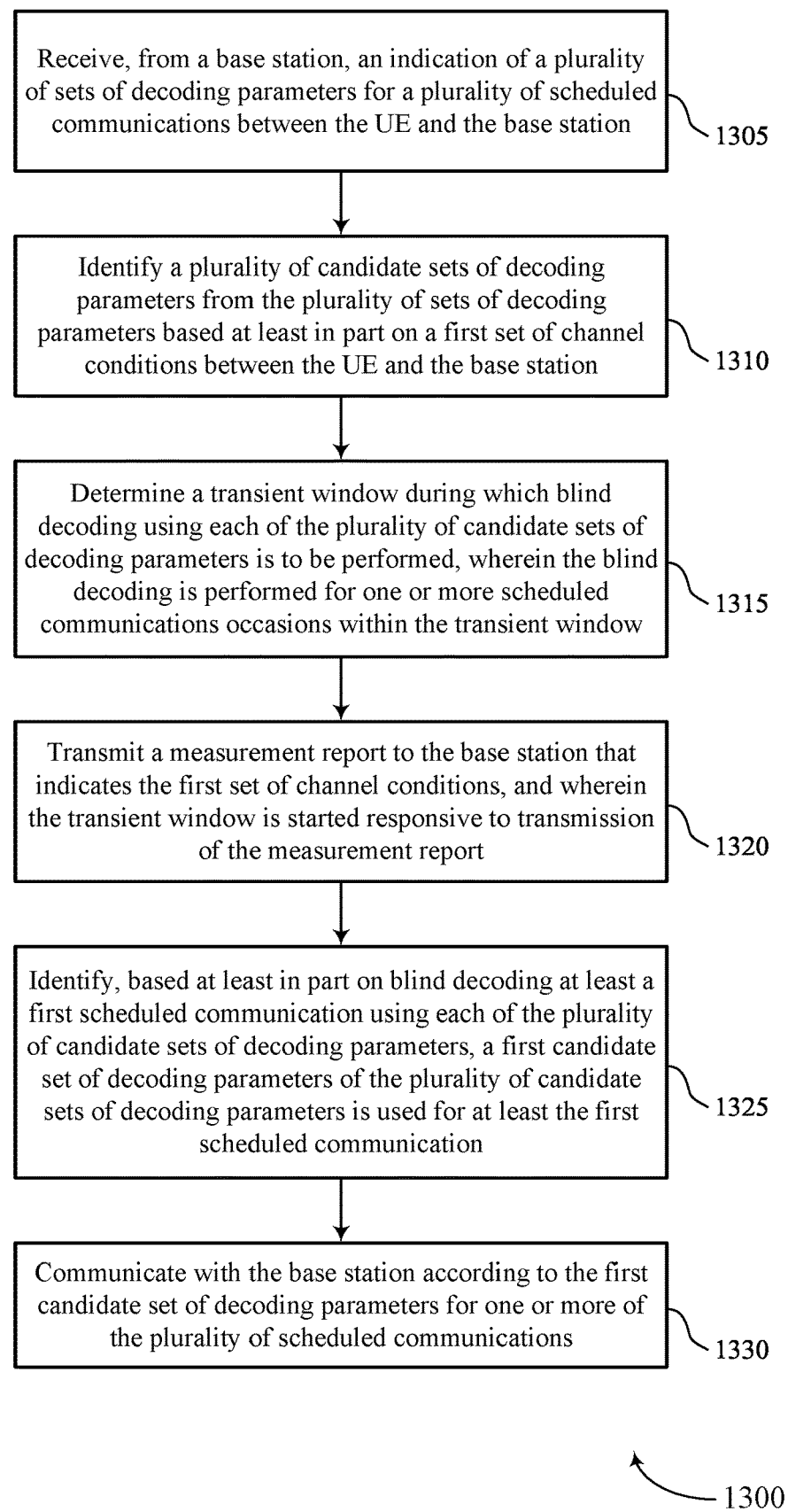

FIG. 13 shows a flowchart illustrating a method 1300 that supports techniques for multi-hypothesis reception for scheduled communications in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of a set of multiple sets of decoding parameters for a set of multiple scheduled communications between the UE and the base station. The operations of 1305 may be performed in accordance with examples as disclosed herein. In some examples, aspects of the operations of 1305 may be performed by a configuration manager 625 as described with reference to FIG. 6.

At 1310, the method may include identifying a set of multiple candidate sets of decoding parameters from the set of multiple sets of decoding parameters based on a first set of channel conditions between the UE and the base station. The operations of 1310 may be performed in accordance with examples as disclosed herein. In some examples, aspects of the operations of 1310 may be performed by a decoding parameter manager 630 as described with reference to FIG. 6.

At 1315, the method may include determining a transient window during which blind decoding using each of the set of multiple candidate sets of decoding parameters is to be performed, where the blind decoding is performed for one or more scheduled communications occasions within the transient window. The operations of 1315 may be performed in accordance with examples as disclosed herein. In some examples, aspects of the operations of 1315 may be performed by a blind decoding manager 635 as described with reference to FIG. 6.

At 1320, the method may include transmitting a measurement report to the base station that indicates the first set of channel conditions, and where the transient window is started responsive to transmission of the measurement report. The operations of 1320 may be performed in accordance with examples as disclosed herein. In some examples, aspects of the operations of 1320 may be performed by a measurement report manager 645 as described with reference to FIG. 6.

At 1325, the method may include identifying, based on blind decoding at least a first scheduled communication using each of the set of multiple candidate sets of decoding parameters, a first candidate set of decoding parameters of the set of multiple candidate sets of decoding parameters is used for at least the first scheduled communication. The operations of 1325 may be performed in accordance with examples as disclosed herein. In some examples, aspects of the operations of 1325 may be performed by a blind decoding manager 635 as described with reference to FIG. 6.

At 1330, the method may include communicating with the base station according to the first candidate set of decoding parameters for one or more of the set of multiple scheduled communications. The operations of 1330 may be performed in accordance with examples as disclosed herein. In some examples, aspects of the operations of 1330 may be performed by a scheduled communications manager 640 as described with reference to FIG. 6.

Figure 14:
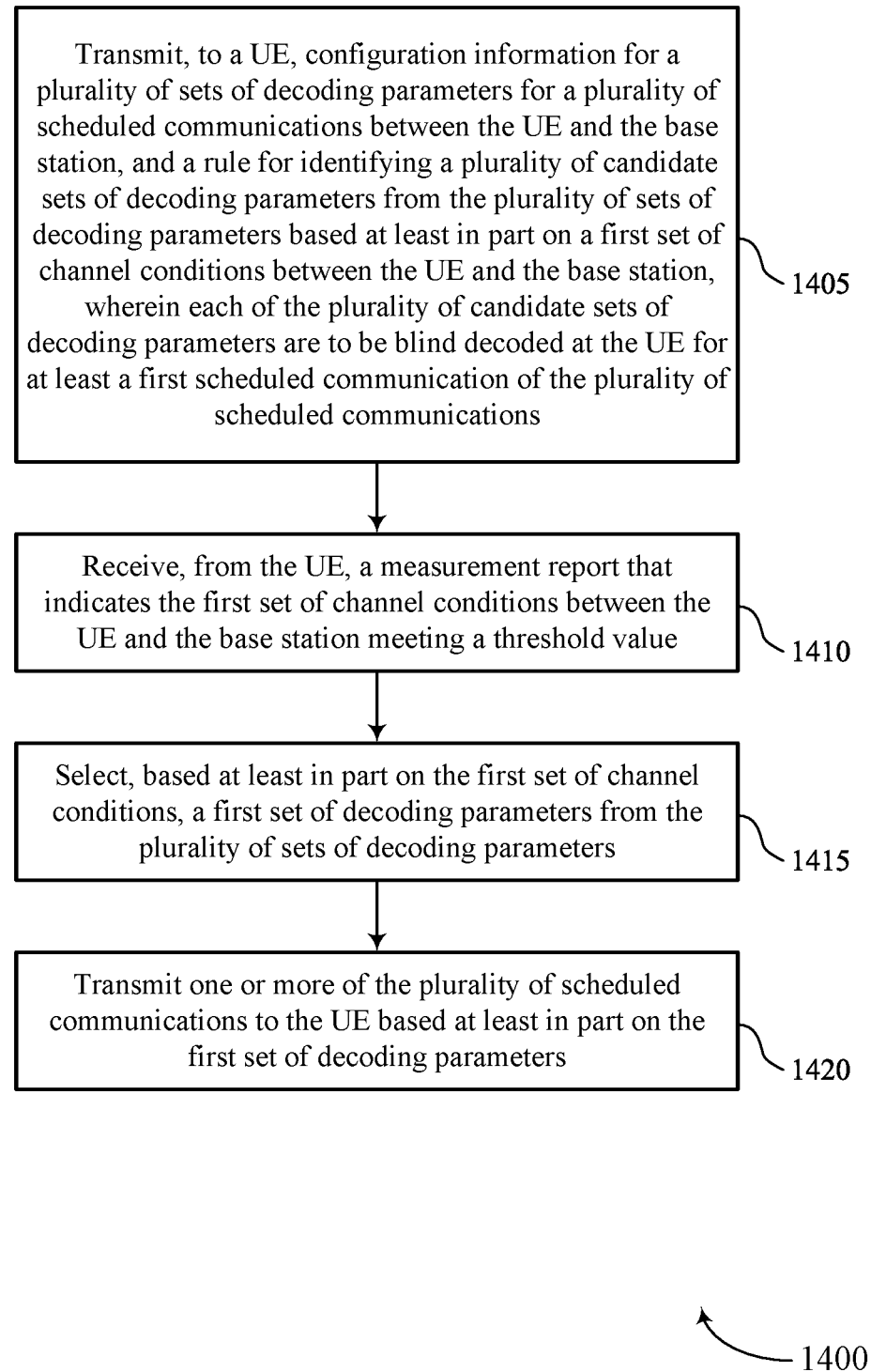

FIG. 14 shows a flowchart illustrating a method 1400 that supports techniques for multi-hypothesis reception for scheduled communications in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include transmitting, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications. The operations of 1405 may be performed in accordance with examples as disclosed herein. In some examples, aspects of the operations of 1405 may be performed by a configuration manager 1025 as described with reference to FIG. 10.

At 1410, the method may include receiving, from the UE, a measurement report that indicates the first set of channel conditions between the UE and the base station meeting a threshold value. The operations of 1410 may be performed in accordance with examples as disclosed herein. In some examples, aspects of the operations of 1410 may be performed by a measurement report manager 1030 as described with reference to FIG. 10.

At 1415, the method may include selecting, based on the first set of channel conditions, a first set of decoding parameters from the set of multiple sets of decoding parameters. The operations of 1415 may be performed in accordance with examples as disclosed herein. In some examples, aspects of the operations of 1415 may be performed by a decoding parameter manager 1035 as described with reference to FIG. 10.

At 1420, the method may include transmitting one or more of the set of multiple scheduled communications to the UE based on the first set of decoding parameters. The operations of 1420 may be performed in accordance with examples as disclosed herein. In some examples, aspects of the operations of 1420 may be performed by a scheduled communications manager 1040 as described with reference to FIG. 10.

Figure 15:
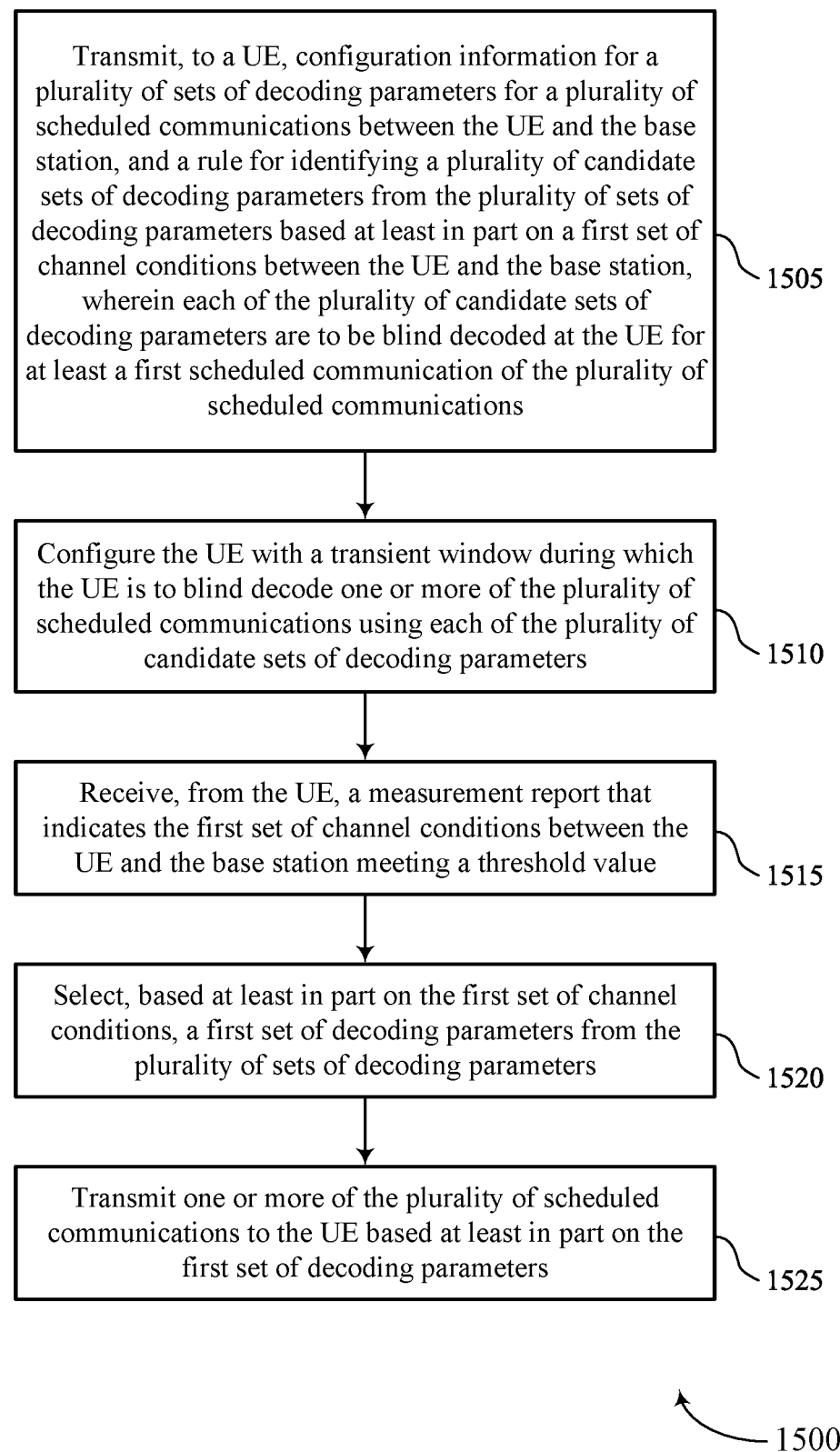

FIG. 15 shows a flowchart illustrating a method 1500 that supports techniques for multi-hypothesis reception for scheduled communications in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications. The operations of 1505 may be performed in accordance with examples as disclosed herein. In some examples, aspects of the operations of 1505 may be performed by a configuration manager 1025 as described with reference to FIG. 10.

At 1510, the method may include configuring the UE with a transient window during which the UE is to blind decode one or more of the set of multiple scheduled communications using each of the set of multiple candidate sets of decoding parameters. The operations of 1510 may be performed in accordance with examples as disclosed herein. In some examples, aspects of the operations of 1510 may be performed by a blind decoding manager 1045 as described with reference to FIG. 10.

At 1515, the method may include receiving, from the UE, a measurement report that indicates the first set of channel conditions between the UE and the base station meeting a threshold value. The operations of 1515 may be performed in accordance with examples as disclosed herein. In some examples, aspects of the operations of 1515 may be performed by a measurement report manager 1030 as described with reference to FIG. 10.

At 1520, the method may include selecting, based on the first set of channel conditions, a first set of decoding parameters from the set of multiple sets of decoding parameters. The operations of 1520 may be performed in accordance with examples as disclosed herein. In some examples, aspects of the operations of 1520 may be performed by a decoding parameter manager 1035 as described with reference to FIG. 10.

At 1525, the method may include transmitting one or more of the set of multiple scheduled communications to the UE based on the first set of decoding parameters. The operations of 1525 may be performed in accordance with examples as disclosed herein. In some examples, aspects of the operations of 1525 may be performed by a scheduled communications manager 1040 as described with reference to FIG. 10.

Figure 16:
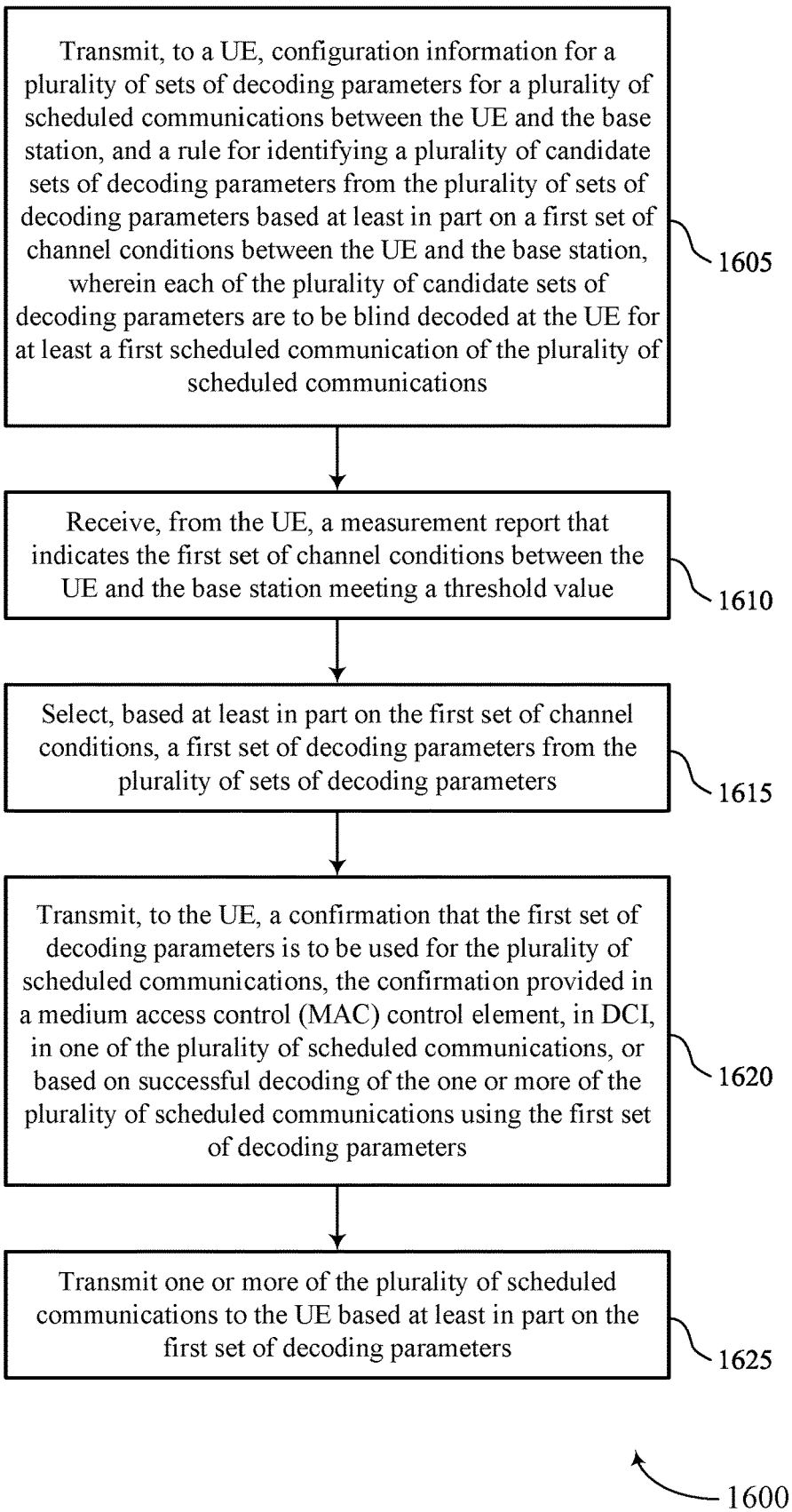

FIG. 16 shows a flowchart illustrating a method 1600 that supports techniques for multi-hypothesis reception for scheduled communications in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, configuration information for a set of multiple sets of decoding parameters for a set of multiple scheduled communications between the UE and the base station, and a rule for identifying a set of multiple candidate sets of decoding parameters from the set of multiple sets of decoding parameters based on a first set of channel conditions between the UE and the base station, where each of the set of multiple candidate sets of decoding parameters are to be blind decoded at the UE for at least a first scheduled communication of the set of multiple scheduled communications. The operations of 1605 may be performed in accordance with examples as disclosed herein. In some examples, aspects of the operations of 1605 may be performed by a configuration manager 1025 as described with reference to FIG. 10.

At 1610, the method may include receiving, from the UE, a measurement report that indicates the first set of channel conditions between the UE and the base station meeting a threshold value. The operations of 1610 may be performed in accordance with examples as disclosed herein. In some examples, aspects of the operations of 1610 may be performed by a measurement report manager 1030 as described with reference to FIG. 10.

At 1615, the method may include selecting, based on the first set of channel conditions, a first set of decoding parameters from the set of multiple sets of decoding parameters. The operations of 1615 may be performed in accordance with examples as disclosed herein. In some examples, aspects of the operations of 1615 may be performed by a decoding parameter manager 1035 as described with reference to FIG. 10.

At 1620, the method may include transmitting, to the UE, a confirmation that the first set of decoding parameters is to be used for the set of multiple scheduled communications, the confirmation provided in a medium access control (MAC) control element, in DCI, in one of the set of multiple scheduled communications, or based on successful decoding of the one or more of the set of multiple scheduled communications using the first set of decoding parameters. The operations of 1620 may be performed in accordance with examples as disclosed herein. In some examples, aspects of the operations of 1620 may be performed by a decoding parameter manager 1035 as described with reference to FIG. 10.

At 1625, the method may include transmitting one or more of the set of multiple scheduled communications to the UE based on the first set of decoding parameters. The operations of 1625 may be performed in accordance with examples as disclosed herein. In some examples, aspects of the operations of 1625 may be performed by a scheduled communications manager 1040 as described with reference to FIG. 10.

The following provides an overview of aspects of the present disclosure:

Aspect 1: A method for wireless communication at a UE, comprising: receiving, from a base station, an indication of a plurality of sets of decoding parameters for a plurality of scheduled communications between the UE and the base station; identifying a plurality of candidate sets of decoding parameters from the plurality of sets of decoding parameters based at least in part on a first set of channel conditions between the UE and the base station; identifying, based at least in part on blind decoding at least a first scheduled communication using each of the plurality of candidate sets of decoding parameters, a first candidate set of decoding parameters of the plurality of candidate sets of decoding parameters is used for at least the first scheduled communication; and communicating with the base station according to the first candidate set of decoding parameters for one or more of the plurality of scheduled communications.

Aspect 2: The method of aspect 1, further comprising: determining a transient window during which blind decoding using each of the plurality of candidate sets of decoding parameters is to be performed, wherein the blind decoding is performed for one or more scheduled communications occasions within the transient window.

Aspect 3: The method of aspect 2, further comprising: transmitting a measurement report to the base station that indicates the first set of channel conditions, and wherein the transient window is started responsive to transmission of the measurement report.

Aspect 4: The method of any of aspects 2 through 3, wherein a length of the transient window is predetermined or indicated by the base station in configuration signaling.

Aspect 5: The method of aspect 4, wherein the length of the transient window corresponds to a number of slots, an absolute time period, a number of instances of the plurality of scheduled communications, a frequency range used for the plurality of scheduled communications, a subcarrier spacing of the plurality of scheduled communications, or any combinations thereof.

Aspect 6: The method of any of aspects 4 through 5, wherein the length of the transient window corresponds to a time period until the UE receives a confirmation of a change in decoding parameters from the base station.

Aspect 7: The method of any of aspects 1 through 6, further comprising: receiving, from the base station, a confirmation that the first candidate set of decoding parameters is to be used for the plurality of scheduled communications, the confirmation provided in a medium access control (MAC) control element, in DCI, in one of the plurality of scheduled communications, or based on successful decoding of the first scheduled communication using the first candidate set of decoding parameters.

Aspect 8: The method of any of aspects 1 through 7, wherein the receiving comprises: receiving a plurality of different sets of resources, transmission parameters, or any combinations thereof, that are mapped to different sets of channel conditions, and wherein the plurality of candidate sets of decoding parameters include the first candidate set of decoding parameters that are mapped to the first set of channel conditions, and a second candidate set of decoding parameters used for one or more scheduled communications prior to the first scheduled communication.

Aspect 9: The method of any of aspects 1 through 8, wherein the plurality of sets of decoding parameters provide different time resources, different frequency resources, different modulation and coding schemes, different multiple-input multiple-output (MIMO) ranks, different numbers of repetitions, different frequency hopping among multiple repetitions, or any combinations thereof, and wherein each of the plurality of sets of decoding parameters have an associated range of measured channel conditions.

Aspect 10: The method of aspect 9, wherein the measured channel conditions include one or more of a channel quality indicator, a reported layer-one (L1) reference signal received power (RSRP), a L1 signal to interference and noise ratio (SINR), or any combinations thereof.

Aspect 11: The method of any of aspects 1 through 10, wherein the plurality of sets of decoding parameters include two or more sets of semi-persistent scheduling (SPS) parameters for downlink SPS transmissions from the base station.

Aspect 12: A method for wireless communication at a base station, comprising: transmitting, to a UE, configuration information for a plurality of sets of decoding parameters for a plurality of scheduled communications between the UE and the base station, and a rule for identifying a plurality of candidate sets of decoding parameters from the plurality of sets of decoding parameters based at least in part on a first set of channel conditions between the UE and the base station, wherein each of the plurality of candidate sets of decoding parameters are to be blind decoded at the UE for at least a first scheduled communication of the plurality of scheduled communications; receiving, from the UE, a measurement report that indicates the first set of channel conditions between the UE and the base station meeting a threshold value; selecting, based at least in part on the first set of channel conditions, a first set of decoding parameters from the plurality of sets of decoding parameters; and transmitting one or more of the plurality of scheduled communications to the UE based at least in part on the first set of decoding parameters.

Aspect 13: The method of aspect 12, further comprising: configuring the UE with a transient window during which the UE is to blind decode one or more of the plurality of scheduled communications using each of the plurality of candidate sets of decoding parameters.

Aspect 14: The method of aspect 13, wherein the transient window is started responsive to transmission of the measurement report.

Aspect 15: The method of any of aspects 13 through 14, wherein a length of the transient window is predetermined or indicated to the UE in configuration signaling.

Aspect 16: The method of aspect 15, wherein the length of the transient window corresponds to a number of slots, an absolute time period, a number of instances of the plurality of scheduled communications, a frequency range used for the plurality of scheduled communications, a subcarrier spacing of the plurality of scheduled communications, or any combinations thereof.

Aspect 17: The method of any of aspects 15 through 16, wherein the length of the transient window corresponds to a time period until the UE receives a confirmation of a change in decoding parameters from the base station.

Aspect 18: The method of any of aspects 12 through 17, further comprising: transmitting, to the UE, a confirmation that the first set of decoding parameters is to be used for the plurality of scheduled communications, the confirmation provided in a medium access control (MAC) control element, in DCI, in one of the plurality of scheduled communications, or based on successful decoding of the one or more of the plurality of scheduled communications using the first set of decoding parameters.

Aspect 19: The method of any of aspects 12 through 18, wherein the configuration information comprises a plurality of different sets of resources, transmission parameters, or any combinations thereof, that are mapped to different sets of channel conditions, and wherein the plurality of candidate sets of decoding parameters include the first set of decoding parameters that are mapped to the first set of channel conditions.

Aspect 20: The method of any of aspects 12 through 19, wherein the plurality of sets of decoding parameters provide different time resources, different frequency resources, different modulation and coding schemes, different multiple-input multiple-output (MIMO) ranks, different numbers of repetitions, different frequency hopping among multiple repetitions, or any combinations thereof, and wherein each of the plurality of sets of decoding parameters have an associated range of measured channel conditions.

Aspect 21: The method of aspect 20, wherein the measured channel conditions include one or more of a channel quality indicator, a reported layer-one (L1) reference signal received power (RSRP), a L1 signal to interference and noise ratio (SINR), or any combinations thereof.

Aspect 22: The method of any of aspects 12 through 21, wherein the plurality of sets of decoding parameters include two or more sets of semi-persistent scheduling (SPS) parameters for downlink SPS transmissions from the base station.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a base station, comprising a processor; memory coupled with the processor; and instructions stored in the memory and executable by the processor to cause the apparatus to perform a method of any of aspects 12 through 22.

Aspect 27: An apparatus for wireless communication at a base station, comprising at least one means for performing a method of any of aspects 12 through 22.

Aspect 28: A non-transitory computer-readable medium storing code for wireless communication at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, from a base station, an indication of a plurality of sets of decoding parameters for a plurality of scheduled communications between the UE and the base station;
identifying a plurality of candidate sets of decoding parameters from the plurality of sets of decoding parameters based at least in part on a first set of channel conditions between the UE and the base station;
identifying, based at least in part on blind decoding at least a first scheduled communication using each of the plurality of candidate sets of decoding parameters, a first candidate set of decoding parameters of the plurality of candidate sets of decoding parameters is used for at least the first scheduled communication; and
communicating with the base station according to the first candidate set of decoding parameters for one or more of the plurality of scheduled communications.

2. The method of claim 1, further comprising:
determining a transient window during which blind decoding using each of the plurality of candidate sets of decoding parameters is to be performed, wherein the blind decoding is performed for one or more scheduled communications occasions within the transient window.

3. The method of claim 2, further comprising:
transmitting a measurement report to the base station that indicates the first set of channel conditions, and wherein the transient window is started responsive to transmission of the measurement report.

4. The method of claim 2, wherein a length of the transient window is predetermined or indicated by the base station in configuration signaling.

5. The method of claim 4, wherein the length of the transient window corresponds to a number of slots, an absolute time period, a number of instances of the plurality of scheduled communications, a frequency range used for the plurality of scheduled communications, a subcarrier spacing of the plurality of scheduled communications, or any combinations thereof.

6. The method of claim 4, wherein the length of the transient window corresponds to a time period until the UE receives a confirmation of a change in decoding parameters from the base station.

7. The method of claim 1, further comprising:
receiving, from the base station, a confirmation that the first candidate set of decoding parameters is to be used for the plurality of scheduled communications, the confirmation provided in a medium access control (MAC) control element, in downlink control information (DCI), in one of the plurality of scheduled communications, or based on successful decoding of the first scheduled communication using the first candidate set of decoding parameters.

8. The method of claim 1, wherein the receiving comprises:
receiving a plurality of different sets of resources, transmission parameters, or any combinations thereof, that are mapped to different sets of channel conditions, and wherein the plurality of candidate sets of decoding parameters include the first candidate set of decoding parameters that are mapped to the first set of channel conditions, and a second candidate set of decoding parameters used for one or more scheduled communications prior to the first scheduled communication.

9. The method of claim 1, wherein the plurality of sets of decoding parameters provide different time resources, different frequency resources, different modulation and coding schemes, different multiple-input multiple-output (MIMO) ranks, different numbers of repetitions, different frequency hopping among multiple repetitions, or any combinations thereof, and wherein each of the plurality of sets of decoding parameters have an associated range of measured channel conditions.

10. The method of claim 9, wherein the measured channel conditions include one or more of a channel quality indicator, a reported layer-one (L1) reference signal received power (RSRP), a L1 signal to interference and noise ratio (SINR), or any combinations thereof.

11. The method of claim 1, wherein the plurality of sets of decoding parameters include two or more sets of semi-persistent scheduling (SPS) parameters for downlink SPS transmissions from the base station.

12. A method for wireless communication at a base station, comprising:
transmitting, to a user equipment (UE), configuration information for a plurality of sets of decoding parameters for a plurality of scheduled communications between the UE and the base station, and a rule for identifying a plurality of candidate sets of decoding parameters from the plurality of sets of decoding parameters based at least in part on a first set of channel conditions between the UE and the base station, wherein each of the plurality of candidate sets of decoding parameters are to be blind decoded at the UE for at least a first scheduled communication of the plurality of scheduled communications;
receiving, from the UE, a measurement report that indicates the first set of channel conditions between the UE and the base station meeting a threshold value;
selecting, based at least in part on the first set of channel conditions, a first set of decoding parameters from the plurality of sets of decoding parameters; and
transmitting one or more of the plurality of scheduled communications to the UE based at least in part on the first set of decoding parameters.

13. The method of claim 12, further comprising:
configuring the UE with a transient window during which the UE is to blind decode one or more of the plurality of scheduled communications using each of the plurality of candidate sets of decoding parameters.

14. The method of claim 13, wherein the transient window is started responsive to transmission of the measurement report.

15. The method of claim 13, wherein a length of the transient window is predetermined or indicated to the UE in configuration signaling.

16. The method of claim 15, wherein the length of the transient window corresponds to a number of slots, an absolute time period, a number of instances of the plurality of scheduled communications, a frequency range used for the plurality of scheduled communications, a subcarrier spacing of the plurality of scheduled communications, or any combinations thereof.

17. The method of claim 15, wherein the length of the transient window corresponds to a time period until the UE receives a confirmation of a change in decoding parameters from the base station.

18. The method of claim 12, further comprising:
transmitting, to the UE, a confirmation that the first set of decoding parameters is to be used for the plurality of scheduled communications, the confirmation provided in a medium access control (MAC) control element, in downlink control information (DCI), in one of the plurality of scheduled communications, or based on successful decoding of the one or more of the plurality of scheduled communications using the first set of decoding parameters.

19. The method of claim 12, wherein the configuration information comprises a plurality of different sets of resources, transmission parameters, or any combinations thereof, that are mapped to different sets of channel conditions, and wherein the plurality of candidate sets of decoding parameters include the first set of decoding parameters that are mapped to the first set of channel conditions.

20. The method of claim 12, wherein the plurality of sets of decoding parameters provide different time resources, different frequency resources, different modulation and coding schemes, different multiple-input multiple-output (MIMO) ranks, different numbers of repetitions, different frequency hopping among multiple repetitions, or any combinations thereof, and wherein each of the plurality of sets of decoding parameters have an associated range of measured channel conditions.

21. The method of claim 20, wherein the measured channel conditions include one or more of a channel quality indicator, a reported layer-one (L1) reference signal received power (RSRP), a L1 signal to interference and noise ratio (SINR), or any combinations thereof.

22. The method of claim 12, wherein the plurality of sets of decoding parameters include two or more sets of semi-persistent scheduling (SPS) parameters for downlink SPS transmissions from the base station.

23. An apparatus for wireless communication at a user equipment (UE), comprising:
a processor;
memory coupled with the processor; and
instructions stored in the memory and executable by the processor to cause the apparatus to:
receive, from a base station, an indication of a plurality of sets of decoding parameters for a plurality of scheduled communications between the UE and the base station;
identify a plurality of candidate sets of decoding parameters from the plurality of sets of decoding parameters based at least in part on a first set of channel conditions between the UE and the base station;
identify, based at least in part on blind decoding at least a first scheduled communication using each of the plurality of candidate sets of decoding parameters, a first candidate set of decoding parameters of the plurality of candidate sets of decoding parameters is used for at least the first scheduled communication; and
communicate with the base station according to the first candidate set of decoding parameters for one or more of the plurality of scheduled communications.

24. The apparatus of claim 23, wherein the instructions are further executable by the processor to cause the apparatus to:
determine a transient window during which blind decoding using each of the plurality of candidate sets of decoding parameters is to be performed, wherein the blind decoding is performed for one or more scheduled communications occasions within the transient window.

25. The apparatus of claim 24, wherein the instructions are further executable by the processor to cause the apparatus to:
transmit a measurement report to the base station that indicates the first set of channel conditions, and wherein the transient window is started responsive to transmission of the measurement report.

26. The apparatus of claim 24, wherein a length of the transient window is predetermined or indicated by the base station in configuration signaling.

27. The apparatus of claim 23, wherein the plurality of sets of decoding parameters provide different time resources, different frequency resources, different modulation and coding schemes, different multiple-input multiple-output (MIMO) ranks, different numbers of repetitions, different frequency hopping among multiple repetitions, or any combinations thereof, and wherein each of the plurality of sets of decoding parameters have an associated range of measured channel conditions.

28. An apparatus for wireless communication at a base station, comprising:
a processor;
memory coupled with the processor; and
instructions stored in the memory and executable by the processor to cause the apparatus to:
transmit, to a user equipment (UE), configuration information for a plurality of sets of decoding parameters for a plurality of scheduled communications between the UE and the base station, and a rule for identifying a plurality of candidate sets of decoding parameters from the plurality of sets of decoding parameters based at least in part on a first set of channel conditions between the UE and the base station, wherein each of the plurality of candidate sets of decoding parameters are to be blind decoded at the UE for at least a first scheduled communication of the plurality of scheduled communications;
receive, from the UE, a measurement report that indicates the first set of channel conditions between the UE and the base station meeting a threshold value;
select, based at least in part on the first set of channel conditions, a first set of decoding parameters from the plurality of sets of decoding parameters; and
transmit one or more of the plurality of scheduled communications to the UE based at least in part on the first set of decoding parameters.

29. The apparatus of claim 28, wherein the instructions are further executable by the processor to cause the apparatus to:
configure the UE with a transient window during which the UE is to blind decode one or more of the plurality of scheduled communications using each of the plurality of candidate sets of decoding parameters.

30. The apparatus of claim 29, wherein the transient window is started responsive to transmission of the measurement report.

* * * * *